(12) United States Patent
Morinaka

(10) Patent No.: US 11,060,615 B2
(45) Date of Patent: Jul. 13, 2021

(54) LABYRINTH SEAL

(71) Applicant: KOBE STEEL, LTD., Hyogo (JP)

(72) Inventor: Shunsuke Morinaka, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 361 days.

(21) Appl. No.: 16/304,329

(22) PCT Filed: May 26, 2017

(86) PCT No.: PCT/JP2017/019810
§ 371 (c)(1),
(2) Date: Nov. 26, 2018

(87) PCT Pub. No.: WO2017/209018
PCT Pub. Date: Dec. 7, 2017

(65) Prior Publication Data
US 2019/0136863 A1 May 9, 2019

(30) Foreign Application Priority Data

May 31, 2016 (JP) .............................. JP2016-109199

(51) Int. Cl.
*F16J 15/447* (2006.01)
*F01D 11/02* (2006.01)
*F02C 7/28* (2006.01)

(52) U.S. Cl.
CPC ........... *F16J 15/4472* (2013.01); *F01D 11/02* (2013.01); *F16J 15/447* (2013.01); *F02C 7/28* (2013.01)

(58) Field of Classification Search
CPC ........ F16J 15/447; F16J 15/4472; F02C 7/28; F01D 11/02
See application file for complete search history.

(56) References Cited

U.S. PATENT DOCUMENTS 2,123,818 A 7/1938 Wegmann
3,940,153 A * 2/1976 Stocker ................ F16J 15/4472
277/418
(Continued)

FOREIGN PATENT DOCUMENTS

DE 39 40 607 A1 6/1990
DE 601 16 966 T2 10/2006
(Continued)

OTHER PUBLICATIONS

International Search Report issued in corresponding International Application No. PCT/JP2017/019810; dated Aug. 22, 2017.
(Continued)

*Primary Examiner* — Nicholas L Foster
(74) *Attorney, Agent, or Firm* — Studebaker & Brackett PC

(57) ABSTRACT

A labyrinth seal includes a step portion formed on an outer circumferential portion of a rotary body, a fin extending radially inward from an inner circumferential portion of a stationary body, and an annular groove formed in the outer circumferential portion of the rotary body. The step portion includes a diameter-increasing step portion and a diameter-decreasing step portion. The fin includes a first fin, a second fin, and a third fin. The annular groove is disposed in at least a part of a region that is located close to the low-pressure side compared to the high-pressure-side step portion and close to the high-pressure side compared to the third fin.

13 Claims, 16 Drawing Sheets

(56) References Cited

U.S. PATENT DOCUMENTS

| | | | |
|---|---|---|---|
| 4,335,886 A * | 6/1982 | Frey | F16J 15/4472 |
| | | | 277/412 |
| 5,029,876 A | 7/1991 | Orlando et al. | |
| 6,467,773 B1 | 10/2002 | Rinaldo | |
| 6,834,860 B2 * | 12/2004 | Rinaldo | F16J 15/4472 |
| | | | 277/418 |
| 9,593,587 B2 * | 3/2017 | Matsumoto | F01D 11/08 |
| 9,650,907 B2 * | 5/2017 | Bricaud | F01D 11/02 |
| 10,281,046 B2 * | 5/2019 | Daussin | F16J 15/4472 |
| 10,570,768 B2 * | 2/2020 | Morinaka | F04D 29/10 |
| 2003/0030223 A1 | 2/2003 | Rinaldo | |
| 2011/0250073 A1 * | 10/2011 | Neeli | F01D 11/001 |
| | | | 416/223 R |
| 2012/0027582 A1 | 2/2012 | Natarajan et al. | |
| 2017/0022838 A1 | 1/2017 | Kuwamura et al. | |
| 2018/0156337 A1 * | 6/2018 | Daussin | F16J 15/4472 |
| 2018/0187567 A1 * | 7/2018 | Morinaka | F04D 29/10 |
| 2018/0355979 A1 * | 12/2018 | Nishikawa | F01D 5/225 |
| 2019/0072185 A1 * | 3/2019 | Morinaka | F16J 15/4472 |
| 2019/0186637 A1 * | 6/2019 | Morinaka | F16J 15/4476 |
| 2019/0234416 A1 * | 8/2019 | Morinaka | F16J 15/447 |
| 2019/0285183 A1 * | 9/2019 | Morinaka | F16J 15/4472 |

FOREIGN PATENT DOCUMENTS

| | | |
|---|---|---|
| DE | 10 2011 052 347 A1 | 2/2012 |
| EP | 2 375 001 A2 | 10/2011 |
| JP | S51-082855 A | 7/1976 |
| JP | S53-104803 U | 8/1978 |
| JP | 2011-220522 A | 11/2011 |
| JP | 2015-108301 A | 6/2015 |

OTHER PUBLICATIONS

Written Opinion issued in corresponding International Application No. PCT/JP2017/019810; dated Aug. 22, 2017.

* cited by examiner

LABYRINTH SEAL

TECHNICAL FIELD

The present invention relates to a labyrinth seal.

BACKGROUND ART

Patent Literature 1 (see FIG. 7 of this Patent Literature), for example, discloses a conventional labyrinth seal. This labyrinth seal serves to prevent fluid leakage through a gap between a rotary body and a stationary body, which constitutes a rotary machine. This labyrinth seal includes a step portion formed in an outer circumferential portion of the rotary body and plural fins provided on an inner circumferential portion of the stationary body. With this configuration, loss of fluid energy is caused by vortices formed in the spaces between the fins, whereby the fluid leakage rate is lowered.

CITATION LIST

Patent Literature

Patent Literature 1: JP-A-2015-108301

SUMMARY OF THE INVENTION

Technical Problems

FIG. 7 of the above Patent Literature shows two large vortices and two small vortices. The effect of causing loss of fluid energy of the small vortices is smaller than that of the large vortices. Thus, the fluid leakage rate may not be lowered sufficiently.

An object of the present invention is therefore to provide a labyrinth seal capable of lowering the fluid leakage rate.

Solution to Problems

The labyrinth seal in the present invention is included in a rotary machine. The rotary machine includes a stationary body, a rotary body and gap. The rotary body is disposed close to a radially inner side compared to the stationary body and rotates about a rotation axis. The gap is formed between an inner circumferential portion of the stationary body and an outer circumferential portion of the rotary body so that a fluid flows in a radial direction from a high-pressure side to a low-pressure side. The labyrinth seal includes: a step portion formed on the outer circumferential portion of the rotary body; a fin extending radially inward from the inner circumferential portion of the stationary body; and an annular groove formed in the outer circumferential portion of the rotary body. The step portion includes: a diameter-increasing step portion constituted so that a diameter thereof on the low-pressure side is larger than a diameter thereof on the high-pressure side; and a diameter-decreasing step portion constituted so that a diameter thereof on the low-pressure side is smaller than a diameter thereof on the high-pressure side. One step portion located on the high-pressure side, between the diameter-increasing step portion and the diameter-decreasing step portion, is referred to as a high-pressure-side step portion and the other step portion located on the low-pressure side is referred to as a low-pressure-side step portion. The fin includes: a first fin disposed close to the high-pressure side compared to the high-pressure-side step portion; a second fin disposed close to the low-pressure side compared to the high-pressure-side step portion and close to the high-pressure side compared to the low-pressure-side step portion; and a third fin disposed close to the low-pressure side compared to the low-pressure-side step portion. The annular groove is disposed in at least a part of a region that is located close to the low-pressure side compared to the high-pressure-side step portion and close to the high-pressure side compared to the third fin.

Advantageous Effects of the Invention

The above configuration can lower the fluid leakage rate.

BRIEF DESCRIPTION OF THE DRAWINGS

FIG. 2 is a sectional view of the rotary machine shown in FIG. 1, with the dimensions and the like.

DESCRIPTION OF EMBODIMENTS

First Embodiment

Figure 1:
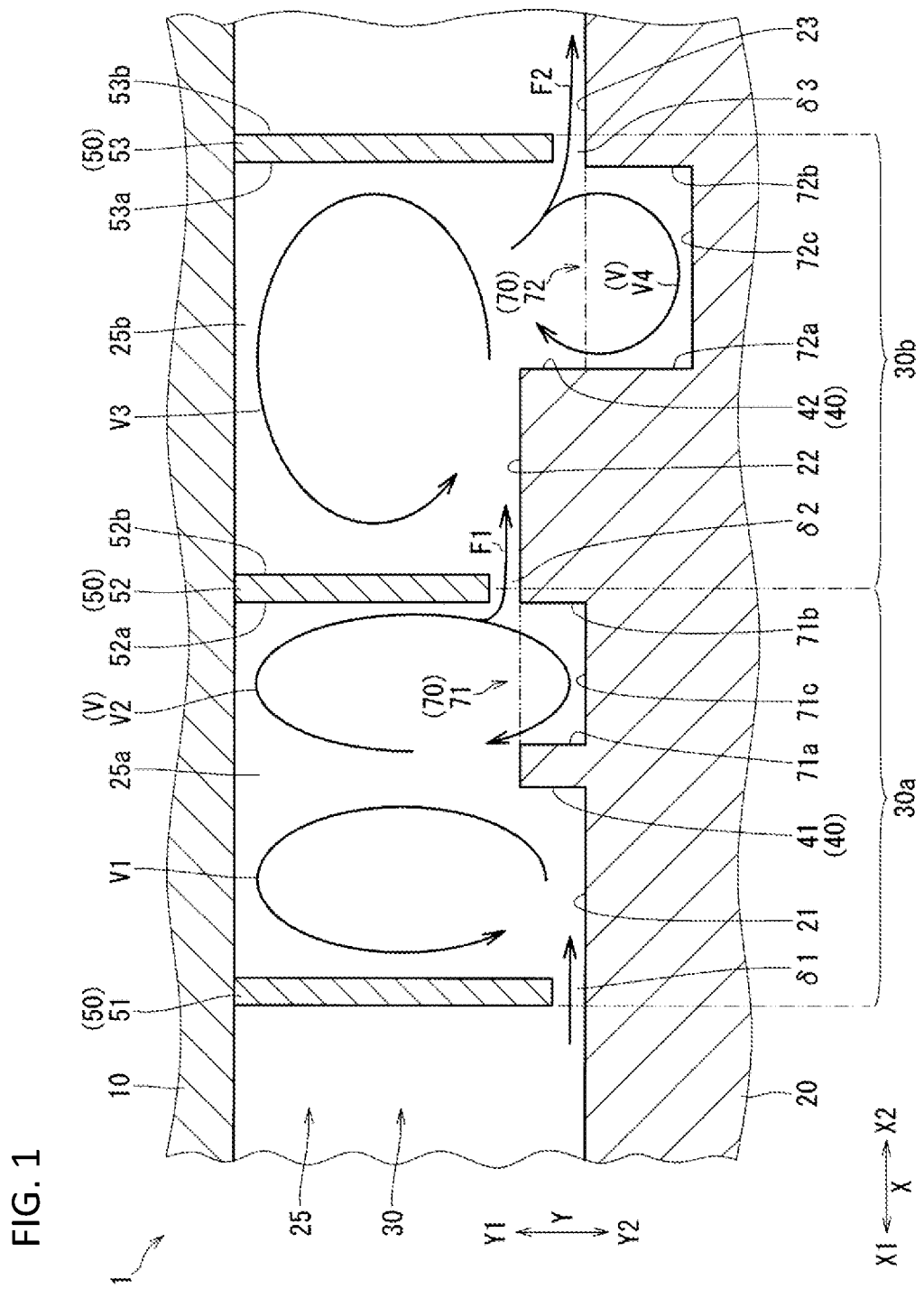
FIG. 1 is a sectional view of a rotary machine according to a first embodiment.

A rotary machine 1 according to a first embodiment shown in FIG. 1 is described with reference to FIG. 1 to FIG. 5.

For example, the rotary machine 1 is a compressor such as a turbo compressor. The rotary machine 1 includes a stationary body 10, a rotary body 20, and a labyrinth seal 30. The stationary body 10 is disposed inside a casing (not shown) and fixed to the casing.

The rotary body 20 is disposed close to the radially inner side Y2 compared to the stationary body 10 with a gap 25 formed between the rotary body 20 and the stationary body 10. The rotary body 20 is attached to a casing rotatably via a bearing (not shown) and rotates about a rotation axis relative to the stationary body 10. The axial direction X (high-pressure side X1 and low-pressure side X2), the radial direction Y (radially outer side Y1 and radially inner side Y2), and the circumferential direction (circumferential direction of rotary body) are defined with reference to the rotary axis. The rotary body 20 includes a high-pressure-side small diameter portion 21, a large diameter portion 22, and a low-pressure-side small diameter portion 23 which are arranged in this order from the high-pressure side X1 to the low-pressure side X2. The large diameter portion 22 is larger in diameter than the high-pressure-side small diameter portion 21. The low-pressure-side small diameter portion 23 is smaller in diameter than the large diameter portion 22. For example, the low-pressure-side small diameter portion 23 is the same in diameter as the high-pressure-side small diameter portion 21. Alternatively, the low-pressure-side small diameter portion 23 may be larger or smaller in diameter than the high-pressure-side small diameter portion 21.

A gap 25 is formed between an inner circumferential portion (a portion located on the radially inner side Y2) of the stationary body 10 and an outer circumferential portion (a portion located on the radially outer side Y1) of the rotary body 20. The gap 25 is formed so that a fluid flows through the gap 25 from the high-pressure side X1 to the low-pressure side X2. A region of the gap 25 between a first fin 51 (described later) and a second fin 52 (described later) is a diameter-increase-side space 25a. A region of the gap 25 between the second fin 52 and a third fin 53 (described later) is a diameter-decrease-side space 25b.

The labyrinth seal 30 prevents fluid leakage caused in the gap 25 from the high-pressure side X1 to the low-pressure side X2. The labyrinth seal 30 is a shaft seal device for lowering a leakage flow rate (hereinafter also referred to as a "leakage rate") of fluid without contact between the stationary body 10 and the rotary body 20 (i.e., in a non-contact manner). The labyrinth seal 30 includes step portions 40, fins 50, and annular grooves 70.

The step portions 40 are formed on the outer circumferential portion of the rotary body 20. Each step portion 40 is formed so that a diameter of the rotary body 20 on the low-pressure side X2 of the step portion 40 is different from a diameter of the rotary body 20 on the high-pressure side X1 of the step portion 40. The step portions 40 include a diameter-increasing step portion 41 and a diameter-decreasing step portion 42.

The diameter-increasing step portion 41 is constituted so that the rotary body 20 is larger in diameter on the low-pressure side X2 than on the high-pressure side X1. The diameter-increasing step portion 41 is constituted so that the diameter of the rotary body 20 on the low-pressure side X2 of the diameter-increasing step portion 41 is larger than that on the high-pressure side X1 of the diameter-increasing step portion 41. The diameter-increasing step portion 41 is connected to the end on the low-pressure side X2 in the high-pressure-side small diameter portion 21 and the end on the high-pressure side X1 in the large diameter portion 22.

The diameter-decreasing step portion 42 is constituted so that the rotary body 20 is smaller in diameter on the low-pressure side X2 of it than on the high-pressure side X1. The diameter-decreasing step portion 42 is constituted so that the diameter of the rotary body 20 on the low-pressure side X2 of the diameter-decreasing step portion 42 is smaller than that on the high-pressure side X1 of the diameter-decreasing step portion 42. The diameter-decreasing step portion 42 is connected to the end on the low-pressure side X2 in the large diameter portion 22 and the end on the high-pressure side X1 in a small diameter portion annular groove 72 (described later). The diameter-decreasing step portion 42 may be connected to the end on the high-pressure side X1 in the low-pressure-side small diameter portion 23 (see FIG. 10).

(Step Portion on the High-Pressure Side X1 and Step Portion on the Low-Pressure Side X2)

One step portion (in this embodiment, the diameter-increasing step portion 41) located on the high-pressure side X1, between the diameter-increasing step portion 41 and the diameter-decreasing step portion 42 is referred to as a "step portion on the high-pressure side X1" and the other step portion (in this embodiment, the diameter-decreasing step portion 42) located on the low-pressure side X2 is referred to as a "step portion on the low-pressure side X2."

The fins 50 are ring-shaped portions which extend radially inward Y2 from the inner circumferential portion of the stationary body 10 to vicinities of the outer circumferential surface of the rotary body 20 and the gap 25 is partitioned thereby. The fins 50 are disposed so as to be unified with the stationary body 10. Alternatively, the fins 50 may be formed so as not to be unified with the stationary body 10. The fins 50 include a first fin 51, a second fin 52, and a third fin 53 which are arranged in this order from the high-pressure side X1 to the low-pressure side X2.

The first fin 51 is disposed close to the high-pressure side X1 compared to the diameter-increasing step portion 41. The first fin 51 is disposed at such a position as to face the high-pressure-side small diameter portion 21 in the radial direction Y. The position of a distal end (an end on the radially inner side Y2) of the first fin 51 in the radial direction Y is located close to the radially inner side Y2 compared to the position of the outer circumferential surface of the large diameter portion 22 in the radial direction Y. A gap 81 in the radial direction Y is formed between the distal end of the first fin 51 and the rotary body 20.

The second fin 52 is disposed close to the low-pressure side X2 compared to the diameter-increasing step portion 41 and close to the high-pressure side X1 compared to the diameter-decreasing step portion 42. The second fin 52 is disposed at such a position as to face the large diameter portion 22 in the radial direction Y and may be disposed at such a position as to face an annular groove 70 (large diameter portion annular groove 71 (described later)) in the radial direction Y. A gap 82 in the radial direction Y is formed between the distal end of the second fin 52 and the rotary body 20. The gap 82 serves as a fluid outflow exit from the diameter-increase-side space 25a. The second fin 52 has a high-pressure-side surface 52a which is a side surface on the high-pressure side X1 and a low-pressure-side surface 52b which is a side surface on the low-pressure side X2. The high-pressure-side surface 52a and the low-pressure-side surface 52b are surfaces perpendicular to the axial direction X. The term "perpendicular" includes approximately perpendicular (this also applies to the following description).

The third fin 53 is disposed close to the low-pressure side X2 compared to the diameter-decreasing step portion 42. The third fin 53 is disposed at such a position as to face the low-pressure-side small diameter portion 23 in the radial direction Y. Alternatively, the third fin 53 may be disposed at such a position as to face an annular groove 70 (small diameter portion annular groove 72 (described later)) in the radial direction Y. The position of the distal end of the third fin 53 in the radial direction Y is located close to the radially inner side Y2 compared to the position of the outer circumferential surface of the large diameter portion 22 in the radial direction Y. A gap 83 in the radial direction Y is formed between the distal end of the third fin 53 and the rotary body 20. The gap δ3 serves as a fluid outflow exit from the diameter-decrease-side space 25b and also serves a fluid outflow exit from the labyrinth seal 30. The third fin 53 has a high-pressure-side surface 53a which is a side surface on the high-pressure side X1 and a low-pressure-side surface 53b which is a side surface on the low-pressure side X2. The high-pressure-side surface 53a and the low-pressure-side surface 53b are surfaces perpendicular to the axial direction X.

(Large Diameter Portion Side Fin and Small Diameter Portion Side Fin)

Among the fins 50 disposed close to the low-pressure side X2 compared to the diameter-increasing step portion 41, the one fin closest to the diameter-increasing step portion 41 is referred to as a "large diameter portion side fin." In this embodiment, the "large diameter portion side fin" is the second fin 52. Among the fins 50 disposed close to the low-pressure side X2 compared to the diameter-decreasing step portion 42, the one fin closest to the diameter-decreasing step portion 42 is referred to as a "small diameter portion side fin." In this embodiment, the "small diameter portion side fin" is the third fin 53.

The annular grooves 70 are grooves into which a vortex V (at least one of vortices V2 and V4) is to flow, and are constituted so that vortices V are to flow into the spaces bounded by the annular grooves 70 (i.e., the spaces inside the respective annular grooves 70), respectively. The annular grooves 70 are formed in the outer circumferential portion of the rotary body 20. The annular grooves 70 are disposed in at least a part of a region that is located close to the low-pressure side X2 compared to the step portion on the high-pressure side X1 (diameter-increasing step portion 41) and close to the high-pressure side X1 compared to the third fin 53. The annular grooves 70 include the large diameter portion annular groove 71 and the small diameter portion annular groove 72.

The large diameter portion annular groove 71 is a groove into which the vortex V2 is to flow. The large diameter portion annular groove 71 is formed in the large diameter portion 22 and recessed radially inward Y2 from the end on the radially outer side Y1 in the large diameter portion 22. The large diameter portion annular groove 71 is disposed in at least a part of a region that is located close to the low-pressure side X2 compared to the diameter-increasing step portion 41 and close to the high-pressure side X1 compared to the large diameter portion side fin (second fin 52). A part of the large diameter portion annular groove 71 may be disposed close to the low-pressure side X2 compared to the high-pressure-side surface 52a.

The large diameter portion annular groove 71 has an annular shape and is formed along the circumferential direction. The shape of the portion bounded by the large diameter portion annular groove 71 (i.e., the portion inside the large diameter portion annular groove 71) is a rectangle in a cross section taken perpendicularly to the circumferential direction. The term "cross section taken perpendicularly to the circumferential direction" means a cross section that is parallel with and includes the rotation axis of the rotary body 20. In FIG. 1, the end on the radially outer side Y1 in the portion bounded by the large diameter portion annular groove 71 is represented by a two-dot chain line. The large diameter portion annular groove 71 includes a high-pressure-side surface 71a which is a side surface on the high-pressure side X1, a low-pressure-side surface 71b which is a side surface on the low-pressure side X2, and a bottom surface 71c. The high-pressure-side surface 71a and the low-pressure-side surface 71b are surfaces perpendicular to the axial direction X. A bottom surface 71c is a surface that is a radially inner side Y2 portion (bottom surface) of the large diameter portion annular groove 71 and is perpendicular to the radial direction Y.

The small diameter portion annular groove 72 is a groove into which the vortex V4 is to flow. The small diameter portion annular groove 72 is formed in the low-pressure-side small diameter portion 23 and recessed radially inward (Y2) from the end on the radially outer side Y1 in the low-pressure-side small diameter portion 23. The small diameter portion annular groove 72 is disposed in at least a part of a region that is located close to the low-pressure side X2 compared to the diameter-decreasing step portion 42 and close to the high-pressure side X1 compared to the small diameter portion side fin (third fin 53). Part of the small diameter portion annular groove 72 may be disposed close to the low-pressure side X2 compared to the high-pressure-side surface 53a.

The small diameter portion annular groove 72 is formed so as to extend from the position of the diameter-decreasing step portion 42 toward the low-pressure side X2. The position of the end on the high-pressure side X1 and on the radially outer side Y1 in the small diameter portion annular groove 72 is the same as the position of the end on the radially inner side Y2 and on the low-pressure side X2 in the diameter-decreasing step portion 42. In a cross section taken perpendicularly to the circumferential direction, the shape of the portion bounded by the small diameter portion annular groove 72 is the same (or approximately the same) as that of the portion bounded by the large diameter portion annular groove 71, and thus, the shape is rectangular. In the embodiment shown in FIG. 1, the portion bounded by the small diameter portion annular groove 72 is larger than the portion bounded by the large diameter portion annular groove 71. Like the large diameter portion annular groove 71, the small diameter portion annular groove 72 includes a high-pressure-side surface 72a which is a side surface on the high-pressure side X1, a low-pressure-side surface 72b which is a side surface on the low-pressure side X2, and a bottom surface 72c. In a cross section taken perpendicularly to the circumferential direction, the high-pressure-side surface 72a and the diameter-decreasing step portion 42 extend straightly in the radial direction Y.

(Structure 30a and Structure 30b)

The portion forming the diameter-increase-side space 25a in the labyrinth seal 30 is referred to as a diameter-increase-side structure 30a. The diameter-increase-side structure 30a includes two fins 50 (first fin 51 and second fin 52), the diameter-increasing step portion 41, and the large diameter portion annular groove 71. The portion forming the diameter-decrease-side space 25b in the labyrinth seal 30 is referred to as a diameter-decrease-side structure 30b. The diameter-decrease-side structure 30b includes two fins 50 (second fin 52 and third fin 53), the diameter-decreasing step portion 42, and the small diameter portion annular groove 72.

(Fluid Flow)

A fluid flows through the gap 25 in the following manner. A fluid passes through the gap 81 from the high-pressure side X1 of the first fin 51, flows into the diameter-increase-side space 25a, and forms a vortex V1 there. The vortex V1 is formed in the following manner. The fluid goes straightly (including a case that it goes approximately straightly) toward the low-pressure side X2 along the outer circumferential surface of the high-pressure-side small diameter portion 21, hits the diameter-increasing step portion 41, and changes its course so as to flow radially outward (Y1). The fluid flowing radially outward (Y1) hits the inner circumferential surface of the stationary body 10, flows toward the high-pressure side X1 along the inner circumferential surface of the stationary body 10, hits the first fin 51, flows along the first fin 51 radially inward (Y2), hits the high-pressure-side small diameter portion 21, and flows toward the low-pressure side X2. The vortex V1 is formed in this manner.

The fluid flowing radially outward (Y1) after hitting the diameter-increasing step portion 41 branches into the vortex V1 and a vortex V2 which is formed close to the low-pressure side X2 compared to the vortex V1. The vortex V2 is formed in the following manner. The fluid branching off from vortex V1 hits the inner circumferential surface of the stationary body 10, flows along the inner circumferential surface of the stationary body 10 toward the low-pressure side X2, hits the high-pressure-side surface 52a of the second fin 52, and flows radially inward (Y2) along the high-pressure-side surface 52a. After flowing along the high-pressure-side surface 52a, the fluid flows into the large diameter portion annular groove 71, flows along the inner surfaces of the large diameter portion annular groove 71, and flows radially outward (Y1) from the large diameter portion annular groove 71, that is, flows out of the large diameter portion annular groove 71. The vortex V2 is formed in this manner.

The fluid flowing radially inward (Y2) along the high-pressure-side surface 52a branches into the vortex V2 and a branch flow F1 which is a flow toward the gap 82. The branch flow F1 passes through the gap 82, flows toward the low-pressure side X2, and flows (leaks) out of the diameter-increase-side space 25a into the diameter-decrease-side space 25b.

Since the fluid flowing radially inward (Y2) along the high-pressure-side surface 52a flows into the large diameter portion annular groove 71, the flow rate of the branch flow F1 is lowered and hence the leakage rate of fluid that leaks from the diameter-increase-side space 25a is lowered. Inter-fluid friction occurs because of the presence of the vortices V1 and V2 formed in the diameter-increase-side space 25a and fluid energy loss is thereby caused. This is also effective at lowering the leakage rate of fluid that leaks from the diameter-increase-side space 25a. This inter-fluid friction includes friction between fluids and friction between a fluid and the wall surfaces. The wall surfaces can be regarded as fluids having a zero flow speed. The wall surfaces include the surfaces of the large diameter portion annular groove 71, for example.

The branch flow F1 flows into the diameter-decrease-side space 25b, goes straightly (including a case that it goes approximately straightly) toward the low-pressure side X2 along the outer circumferential surface of the large diameter portion 22, hits the third fin 53, and branches into a vortex V3, a vortex v4, and a branch flow F2.

The vortex V3 is formed in the following manner. A part of the fluid flowing toward the third fin 53, that is, toward the low-pressure side X2, hits the third fin 53 and is thereby diverted radially outward (Y1). This fluid flows along the third fin 53 radially outward (Y1), hits the inner circumferential surface of the stationary body 10, flows along the inner circumferential surface of the stationary body 10 toward the high-pressure side X1, and hits the second fin 52. After hitting the second fin 52, the fluid flows along the second fin 52 radially inward (Y2), hits the large diameter portion 22, and flows toward the low-pressure side X2. The vortex V3 is formed in this manner.

A part of the fluid flowing toward the third fin 53, that is, toward the low-pressure side X2, hits the third fin 53 and is thereby diverted radially inward (Y2). This fluid (hereinafter referred to as a "fluid (V4, F2) that has been diverted radially inward (Y2) by the third fin 53") branches into the vortex V4 and the branch flow F2. The vortex V4 is formed in the following manner. A part of the fluid (V4, F2) that has been diverted radially inward (Y2) by the third fin 53 flows into the small diameter portion annular groove 72, flows along the inner surfaces of the small diameter portion annular groove 72, flows out of the small diameter portion annular groove 72 radially outward (Y1), and flows toward the low-pressure side X2, that is, toward the third fin 53. The vortex V4 is formed in this manner.

The branch flow F2 flows in the following manner. A part of the fluid (V4, F2) that has been diverted radially inward (Y2) by the third fin 53 passes through the gap $\delta 3$, flows toward the low-pressure side X2, and flows (leaks) out of the diameter-decrease-side space 25b.

Since a part of the fluid (V4, F2) that has been diverted radially inward (Y2) by the third fin 53 flows into the small diameter portion annular groove 72, the flow rate of the branch flow F2 is lowered and hence the leakage rate of fluid that leaks from the diameter-decrease-side space 25b is lowered. Inter-fluid friction occurs because of the presence of the vortices V3 and V4 formed in the diameter-decrease-side space 25b and fluid energy loss is thereby caused. This is also effective at lowering the leakage rate of fluid that leaks from the diameter-decrease-side space 25b.

(Dimensions)

The effect (lowering of the leakage rate) of the annular grooves 70 are obtained if they are formed in at least a part of the region that is located close to the low-pressure side X2 compared to the diameter-increasing step portion 41 and close to the high-pressure side X1 compared to the third fin 53. The effect of the annular grooves 70 can be enhanced when the following conditions are satisfied.

(Preferable Conditions Relating to Large Diameter Portion Annular Groove 71)

Figure 2:
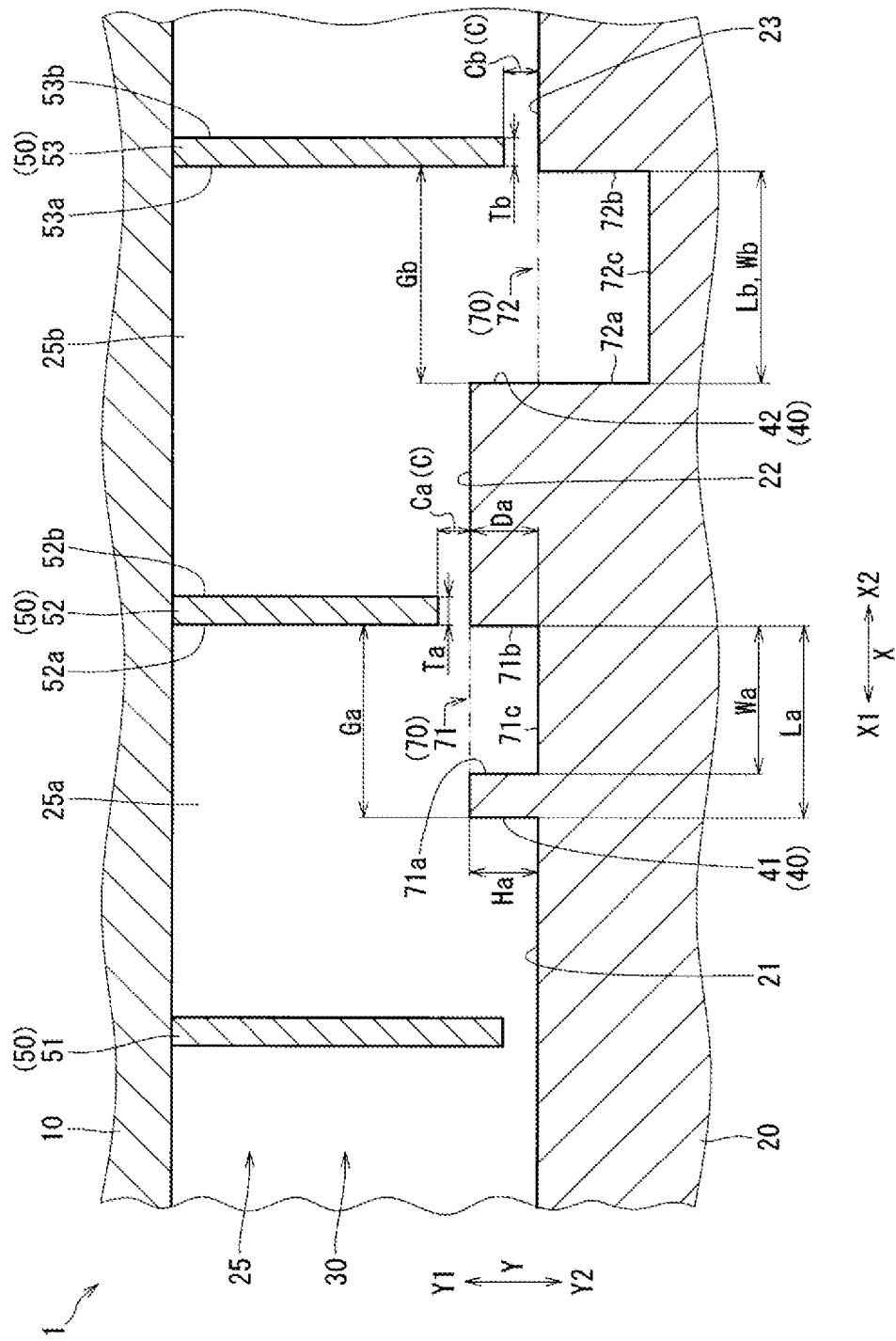

As shown in FIG. 2, the dimensions in the axial direction X in a cross section taken perpendicularly to the circumferential direction are the distance La, distance Ga, opening width Wa, and thickness Ta. These dimensions are defined as follows.

The distance La is the distance (shortest distance) in the axial direction X between the diameter-increasing step portion 41 and the end located on the radially outer side Y1 and on the low-pressure side X2 in the large diameter portion annular groove 71. When the diameter-increasing step portion 41 has a width in the axial direction X (e.g., the diameter-increasing step portion 41 is inclined with respect to the radial direction Y), the origin of the distance La on the high-pressure side X1 is defined as the end located on the radially outer side Y1 and on the low-pressure side X2 in the diameter-increasing step portion 41 (this also applies to the distance Ga). In this embodiment, the distance La is the distance in the axial direction X between the diameter-increasing step portion 41 and the low-pressure-side surface 71b.

The distance Ga is the distance (shortest distance) in the axial direction X between the diameter-increasing step portion 41 and the distal end on the high-pressure side X1 in the second fin 52. In this embodiment, the distance Ga is the distance in the axial direction X between the diameter-increasing step portion 41 and the high-pressure-side surface 52a.

The opening width Wa is the width of the opening of the large diameter portion annular groove 71 in the axial direction X. More specifically, the opening width Wa is the width of the large diameter portion annular groove 71 in the axial direction X at its end on the radially outer side Y1.

The thickness Ta is a width of the distal end of the second fin 52 in the axial direction X. Here, the "distal end of the second fin 52" is the portion that can be hit directly by the branch flow F1 (see FIG. 1). In the embodiment shown in FIG. 6, since the branch flow F1 does not hit the low-pressure-side surface 52*b* directly, the low-pressure-side surface 52*b* is not included in the "distal end of the second fin 52."

As shown in FIG. 2, the dimensions in the radial direction Y in a cross section taken perpendicularly to the circumferential direction are the height Ha and depth Da. These dimensions are defined as follows.

The height Ha is the width of the diameter-increasing step portion 41 in the radial direction Y. More specifically, the height Ha is the distance in the radial direction Y between the end on the low-pressure side X2 in the outer circumferential surface of the high-pressure-side small diameter portion 21 and the end on the high-pressure side X1 in the outer circumferential surface of the large diameter portion 22.

The depth Da is the width of the large diameter portion annular groove 71 in the radial direction Y. More specifically, the depth Da is the distance in the radial direction Y between the end (e.g., bottom surface 71*c*) located on the radially inner side Y2 of the large diameter portion annular groove 71 and the outer circumferential surface of the large diameter portion 22.

(Preferable Condition Relating to Opening Width Wa)

By increasing the opening width Wa, it becomes easier for the vortex V2 (see FIG. 1) to flow into the large diameter portion annular groove 71 and a large vortex V2 can be formed. As a result, the above-mentioned energy loss can be increased. For example, it is preferable to satisfy the relationship "Wa/Ga>0.2".

(Preferable Condition Relating to Distance Ga and Distance La)

It is preferable that the position of the low-pressure-side surface 71*b* in the axial direction X be the same as that of the high-pressure-side surface 52*a* in the axial direction X (i.e., they be on the same plane) or the former be located on the low-pressure side X2 of the latter (i.e., Ga≤La). When the relationship "Ga≤La" is satisfied, as shown in FIG. 1 it becomes easier for the vortex V2 that has flown radially inward (Y2) along the second fin 52 to flow into the large diameter portion annular groove 71, whereby the flow rate of the branch flow F can be lowered. Since the fluid tends to flow into the large diameter portion annular groove 71, the flow speed of the vortex V2 can be increased, whereby the above-mentioned energy loss can be increased.

Figure 3:
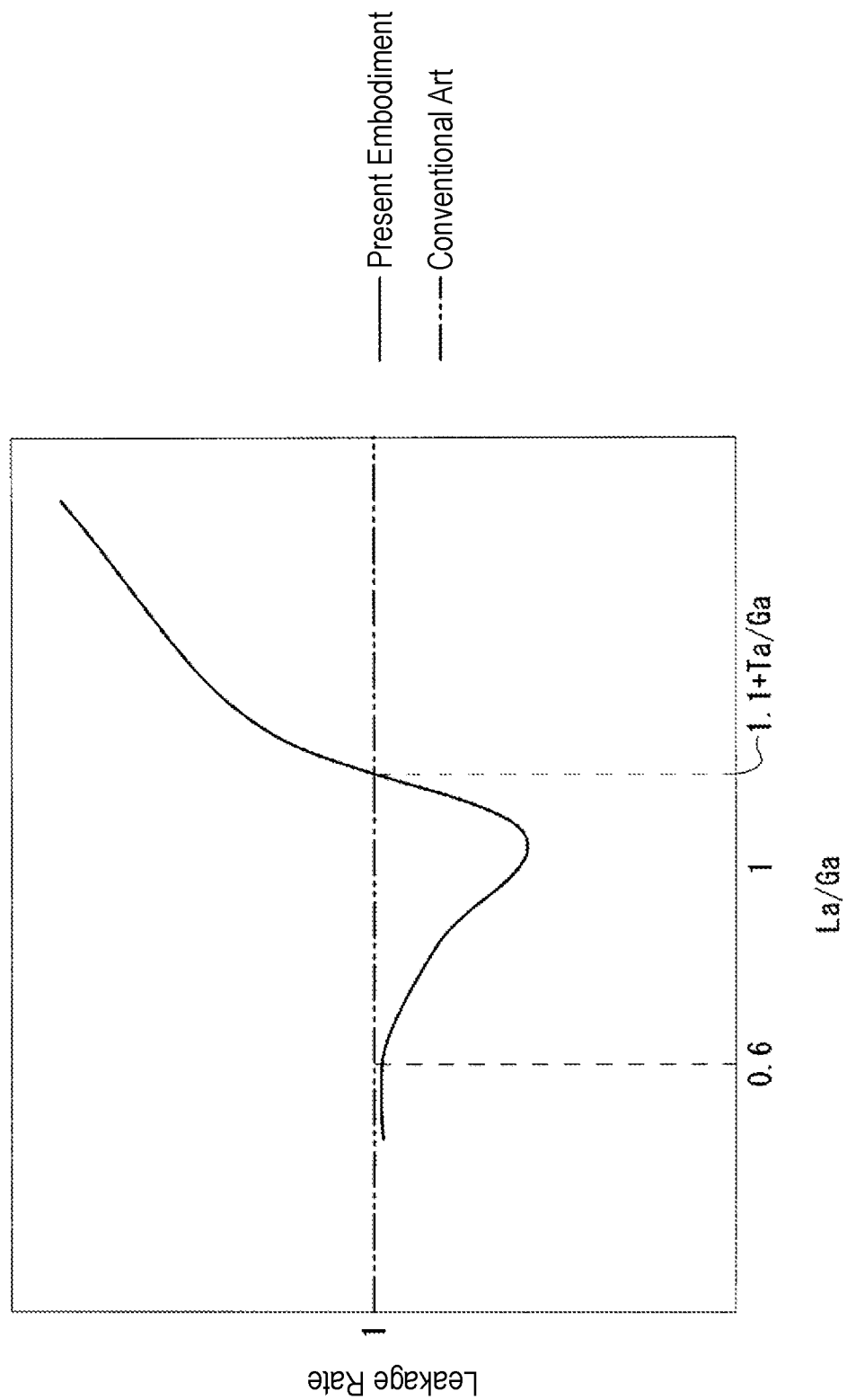
FIG. 3 is a graph showing a relationship between La/Ga (see FIG. 2) and the leakage rate.

Research has been done on the relationship between the position of the high-pressure-side surface 52*a*, the position of the low-pressure-side surface 71*b*, and the leakage rate. As a result, it has been found that the leakage rate varies depending on La/Ga as shown in FIG. 3. The curve labeled "conventional art" in FIG. 3 is directed to a labyrinth seal that does not include the large diameter portion annular groove 71 shown in FIG. 1. In the graph of FIG. 3, the leakage rate (vertical axis) is made dimensionless; more specifically, a leakage rate in the conventional art is made equal to "1" (this also applies to FIG. 4).

When the low-pressure-side surface 71*b* is too distant from the high-pressure-side surface 52*a* to the high-pressure side X1, a fluid flowing along the second fin 52 radially inward (Y2) becomes less apt to flow into the large diameter portion annular groove 71. As a result, the leakage rate lowering effect is reduced. On the other hand, when the low-pressure-side surface 71*b* is too distant from the high-pressure-side surface 52*a* to the low-pressure side X2, the gap 82 between the second fin 52 and the rotary body 20 is increased, and hence, a fluid becomes prone to pass through the gap 82, whereby the leakage rate lowering effect is reduced.

Thus, as shown in FIG. 3, it is preferable that the relationship "0<La/Ga<1.1+Ta/Ga" be satisfied. In this case, the leakage rate can be made smaller reliably than in the conventional art. It is even preferable that the relationship "0.6<La/Ga<1.1+Ta/Ga" be satisfied. In this case, the leakage rate can be made even smaller.

(Preferable Condition Relating to Height Ha and Depth Da)

Figure 4:
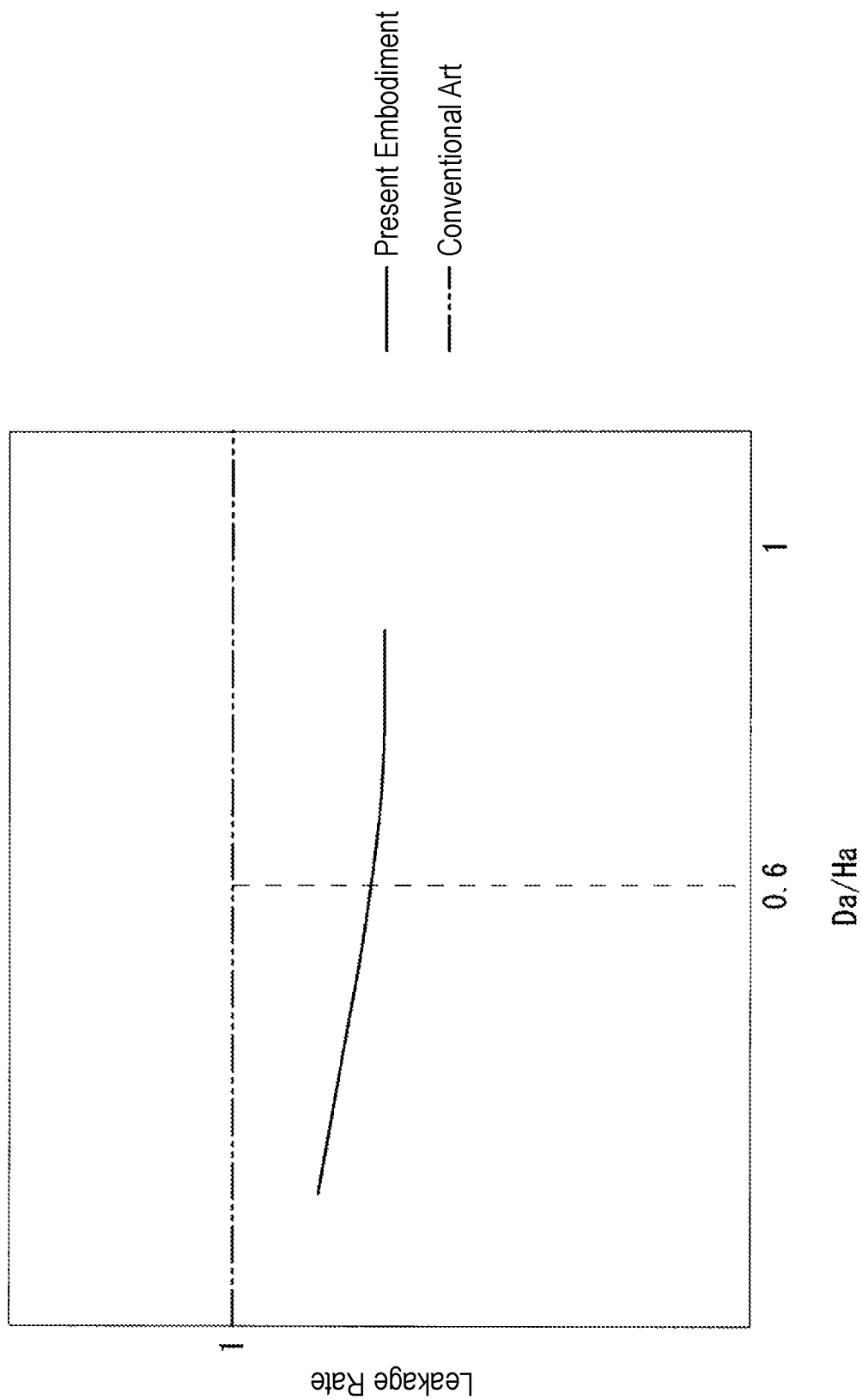
FIG. 4 is a graph showing a relationship between Da/Ha (see FIG. 2) and the leakage rate.

Research has been done on the relationship between the height Ha, the depth Da, and the leakage rate, as shown in FIG. 2. As a result, it has been found that the leakage rate varies depending on Da/Ha as shown in FIG. 4. When the depth Da shown in FIG. 2 is small, the flow rate of the vortex V2 capable of entering the large diameter portion annular groove 71 (see FIG. 1) decreases and the flow rate of the branch flow increases, whereby the leakage rate increases. Thus, as shown in FIG. 4, it is preferable that the relationship "0.6<Da/Ha" be satisfied. In this case, the leakage rate can be made lower reliably than in the conventional art. As long as the relationship "0<Da/Ha" is satisfied, the leakage rate can be made smaller than in the conventional art.

(Preferable Conditions Relating to Small Diameter Portion Annular Groove 72)

As shown in FIG. 2, the dimensions in the axial direction X in a cross section taken perpendicularly to the circumferential direction are the distance Gb, distance Lb, and opening width Wb. These dimensions are defined as follows.

The distance Gb is the distance (shortest distance) in the axial direction X between the diameter-decreasing step portion 42 and the distal end on the high-pressure side X1 in the third fin 53. When the diameter-decreasing step portion 42 has a width in the axial direction X (e.g., the diameter-decreasing step portion 42 is inclined with respect to the radial direction Y), the origin of the distance Gb on the high-pressure side X1 is defined as the end located on the radially inner side Y2 and on the low-pressure side X2 in the diameter-decreasing step portion 42 (see FIG. 9; this also applies to the distance Lb). In this embodiment, the distance Gb is the distance in the axial direction X between the diameter-decreasing step portion 42 and the high-pressure-side surface 53*a*.

The distance Lb is the distance (shortest distance) in the axial direction X between the diameter-decreasing step portion 42 and the end located on the radially outer side Y1 and on the low-pressure side X2 in the small diameter portion annular groove 72. In this embodiment, the distance Lb is the distance in the axial direction X between the diameter-decreasing step portion 42 and the low-pressure-side surface 72*b*.

The opening width Wb is the width of the opening of the small diameter portion annular groove 72 in the axial direction X. More specifically, the opening width Wb is the width of the small diameter portion annular groove 72 at its end on the radially outer side Y1 in the axial direction X. In this embodiment, the opening width Wb is equal to the distance Lb. Thus, in the following preferable condition relating to the distance Lb, the distance Lb can be read as the opening width Wb.

(Preferable Condition Relating to Distance Gb and Distance Lb)

Figure 5:
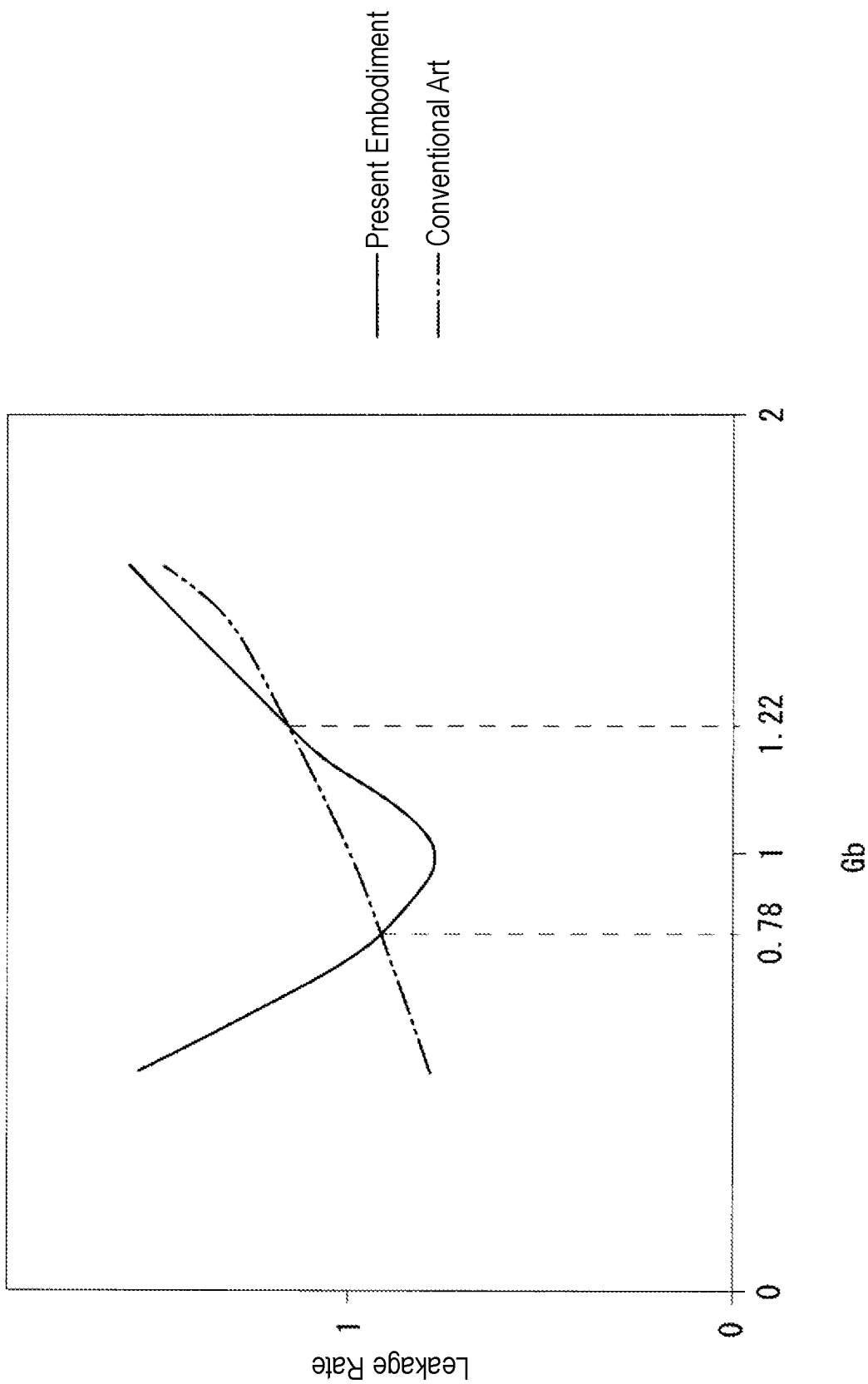
FIG. 5 is a graph showing a relationship between Gb (Gb/Lb) (see FIG. 2) and the leakage rate.

Research has been done on the distance Gb and the distance Lb. As a result, it has been found that the leakage rate varies depending on Gb as shown in FIG. 5. In this research, it was investigated the leakage rate obtained when the distance Gb was varied to various values without varying the position of the small diameter portion annular groove 72 shown in FIG. 2 (without varying the distance Lb). The distance Gb is given a value "1" when it is equal to the distance Lb. The curve labeled "conventional art" in FIG. 5 is directed to a labyrinth seal that does not include the small diameter portion annular groove 72 shown in FIG. 2. In the conventional art, the leakage rate decreases as the third fin 53 comes closer to the diameter-decreasing step portion 42, that is, as Gb decreases. In the graph of FIG. 5, the leakage rate (vertical axis) is made dimensionless; more specifically, a leakage rate that was obtained in the conventional art when Gb was equal to 1 is made equal to "1." In this embodiment, since the distance Gb is given a value "1" when it is equal to the distance Lb, the relationship between Gb and the leakage rate is the same as that between Gb/Lb and the leakage rate. Thus, in this embodiment, Gb represented by the horizontal axis of the graph shown in FIG. 5 can be replaced by Gb/Lb.

The following problem arises when the distance Lb is too short with respect to the distance Gb, that is, when the low-pressure-side surface 72b is too distant from the high-pressure-side surface 53a to the high-pressure side X1. In this case, the fluid (V4, F2) shown in FIG. 1 that has been diverted radially inward (Y2) by the third fin 53 becomes prone to flow into the small diameter portion annular groove 72 and hence the flow rate of the branch flow F2 increases, whereby the leakage rate lowering effect is reduced. On the other hand, the following problem arises when the distance Lb shown is too long with respect to the distance Gb (see FIG. 2), that is, when the low-pressure-side surface 72b is too distant from the high-pressure-side surface 53a to the low-pressure side X2. In this case, the gap δ3 shown in FIG. 1 between the distal end of the third fin 53 and the low-pressure-side small diameter portion 23 increases and hence fluid becomes prone to pass through the gap δ3, whereby the leakage rate lowering effect is reduced.

Thus, as shown in FIG. 5, it is preferable that the relationship "0.78<Gb/Lb<1.22" be satisfied. In this case, the leakage rate can be made smaller reliably than in the conventional art. It is even preferable that Gb/Lb be set equal to about 1.0. That is, it is even preferable that the position of the low-pressure-side surface 72b in the axial direction X be approximately the same as the position of the high-pressure-side surface 53a in the axial direction X. The leakage ratio lowering effect was maximized by setting Gb/Lb equal to about 1.0.

(Advantages of First Aspect of Invention)

Advantages of the labyrinth seal 30 shown in FIG. 1 are as follows. The labyrinth seal 30 is provided in the rotary machine 1. The rotary machine 1 includes the stationary body 10, the rotary body 20, and the gap 25. The rotary body 20 is disposed close to the radially inner side Y2 compared to the stationary body 10 and rotates about the rotation axis. The gap 25 is formed between the inner circumferential portion of the stationary body 10 and the outer circumferential portion of the rotary body 20 so as to allow a fluid to flow in the axial direction X from the high-pressure side X1 to the low-pressure side X2. The labyrinth seal 30 includes the step portions 40 which are formed on the outer circumferential portion of the rotary body 20, the fins 50 which extend radially inward (Y2) from the inner circumferential portion of the stationary body 10, and the annular grooves 70 which are formed in the outer circumferential portion of the rotary body 20.

[Structure 1-1] The step portions 40 include the diameter-increasing step portion 41 and the diameter-decreasing step portion 42. The diameter-increasing step portion 41 is formed so as to make the diameter on the low-pressure side X2 (close to the low-pressure side X2 compared to the diameter-increasing step portion 41) larger than the diameter on the high-pressure side X1 (close to the high-pressure side X1 compared to the diameter-increasing step portion 41). The diameter-decreasing step portion 42 is formed so as to make the diameter on the low-pressure side X2 (close to the low-pressure side X2 compared to the diameter-decreasing step portion 42) larger than the diameter on the high-pressure side X1 (close to the high-pressure side X1 compared to the diameter-decreasing step portion 42). Of the diameter-increasing step portion 41 and the diameter-decreasing step portion 42, the one step portion located on the high-pressure side X1 is referred to as the step portion on the high-pressure side X1 (in this embodiment, diameter-increasing step portion 41) and the other step portion located on the low-pressure side X2 is referred to as the step portion on the low-pressure side X2 (in this embodiment, diameter-decreasing step portion 42).

[Structure 1-2] The fins 50 include the first fin 51, the second fin 52, and the third fin 53. The first fin 51 is disposed close to the high-pressure side X1 compared to the step portion on the high-pressure side X1 (diameter-increasing step portion 41). The second fin 52 is disposed close to the low-pressure side X2 compared to the step portion on the high-pressure side X1 (diameter-increasing step portion 41) and close to the high-pressure side X1 compared to the step portion on the low-pressure side X2 (diameter-decreasing step portion 42). The third fin 53 is disposed close to the low-pressure side X2 compared to the step portion on the low-pressure side X2 (diameter-decreasing step portion 42).

[Structure 1-3] The annular grooves 70 are disposed in at least a part of a region that is located close to the low-pressure side X2 compared to the step portion on the high-pressure side X1 (diameter-increasing step portion 41) and close to the high-pressure side X1 compared to the third fin 53.

The labyrinth seal 30 mainly includes the above [structure 1-1] and [structure 1-2]. Thus, the vortex V2 occurs close to the low-pressure side X2 compared to the step portion on the high-pressure side X1 (diameter-increasing step portion 41) and close to the high-pressure side X1 compared to the second fin 52. In addition, the vortex V4 occurs close to the low-pressure side X2 compared to the step portion on the low-pressure side X2 (diameter-decreasing step portion 42) and close to the high-pressure side X1 compared to the third fin 53. In addition, the labyrinth seal 30 includes the above [structure 1-3]. The vortices V (at least one of the vortex V2 and the vortex V4) therefore flow into the annular grooves 70. Thus, the vortices V can be made larger, their flow rates can be made higher, and their flow speeds can be made higher than the case without the annular grooves 70. Thus, the inter-fluid friction between each vortex and its neighborhood can be increased and hence the fluid energy loss can be increased. As a result, the fluid leakage in the gap 25 can be prevented.

(Advantages of Fifth Aspect of Invention)

Of the fins 50 that are disposed close to the low-pressure side X2 compared to the diameter-increasing step portion

41, the one fin closest to the diameter-increasing step portion 41 is referred to as the large diameter portion side fin (in this embodiment, second fin 52).

[Structure 5] The annular grooves 70 include the large diameter portion annular groove 71. The large diameter portion annular groove 71 is formed in at least a part of a region that is located close to the low-pressure side X2 compared to the diameter-increasing step portion 41 and close to the high-pressure side X1 compared to the large diameter portion side fin (second fin 52).

The vortex V2 is formed in a region that is located close to the low-pressure side X2 compared to the diameter-increasing step portion 41 and close to the high-pressure side X1 compared to the large diameter portion side fin (second fin 52). The branch flow F1 branches off from the vortex V2 and flows toward the gap 82 between the large diameter portion side fin (second fin 52) and the rotary body 20. When the large diameter portion annular groove 71 is not formed, a fluid flowing along the second fin 52 radially inward (Y2) hits the large diameter portion 22 and hence the branch flow F1 branches off from the vortex V2 easily. In view of this, the labyrinth seal 30 includes the above [structure 5]. Thus, the vortex V2 flows into the large diameter portion annular groove 71. Since the flow rate of the branch flow F1 that branches off from the vortex V2 can be lowered, the fluid leakage in the gap 25 can be prevented more.

(Advantages of Sixth Aspect of Invention)

La, Ga, and Ta shown in FIG. 2 are defined as follows. La is the distance in the axial direction X between the diameter-increasing step portion 41 and the end located on the radially outer side Y1 and on the low-pressure side X2 in the large diameter portion annular groove 71. Ga is the distance in the axial direction X between the diameter-increasing step portion 41 and the distal end on the high-pressure side X1 in the large diameter portion side fin (second fin 52). Ta is the width of the distal end of the large diameter portion side fin (second fin 52) in the axial direction X.

[Structure 6] With the above definitions, the relationship "0<La/Ga<1.1+Ta/Ga" is satisfied.

With the above [structure 6], the gap 82 (see FIG. 1) between the large diameter portion side fin (second fin 52) and the rotary body 20 can be made smaller than the case of 1.1+Ta/Ga≤La/Ga. Thus, the fluid leakage through the gap 82 can be prevented more and hence the fluid leakage in the gap 25 can be prevented more (see FIG. 3).

(Advantages of Seventh Aspect of Invention)

[Structure 7] The relationship "0.6<La/Ga<1.1+Ta/Ga" is satisfied.

With the above [structure 7], the flow rate of the vortex V2 that flows into the large diameter portion annular groove 71 shown in FIG. 1 can be made higher than the case of La/Ga≤0.6. Thus, the fluid energy loss of the vortex V2 can be increased more and hence the fluid leakage in the gap 25 can be prevented more (see FIG. 3).

(Advantages of Eighth Aspect of Invention)

As shown in FIG. 2, the width of the diameter-increasing step portion 41 in the radial direction Y is represented by Ha. The width of the large diameter portion annular groove 71 in the radial direction Y is represented by Da.

[Structure 8] With the above definitions, the relationship "0.6<Da/Ha" is satisfied.

With the above [structure 8], the flow rate of the vortex V2 that flows into the large diameter portion annular groove 71 shown in FIG. 1 can be made higher than the case of Da/Ha≤0.6. Thus, the fluid energy loss of the vortex V2 can be increased more and hence the fluid leakage in the gap 25 can be prevented more.

(Advantages of Ninth Aspect of Invention)

Of the fins 50 disposed close to the low-pressure side X2 compared to the diameter-decreasing step portion 42, the one fin closest to the diameter-decreasing step portion 42 is referred to as the small diameter portion side fin (in this embodiment, third fin 53).

[Structure 9] The annular grooves 70 include the small diameter portion annular groove 72. The small diameter portion annular groove 72 is disposed in at least a part of a region that is located close to the low-pressure side X2 compared to the diameter-decreasing step portion 42 and close to the high-pressure side X1 compared to the small diameter portion side fin (third fin 53).

The vortex V4 is formed in a region that is located close to the low-pressure side X2 compared to the diameter-decreasing step portion 42 and close to the high-pressure side X1 compared to the small diameter portion side fin (third fin 53). The branch flow F2 branches off from the vortex V4 toward the gap δ3 between the small diameter portion side fin (third fin 53) and the rotary body 20. When the small diameter portion annular groove 72 is not formed, a fluid flowing toward the third fin 53, that is, toward the low-pressure side X2, hits the third fin 53, is diverted radially inward (Y2), and hits the low-pressure-side small diameter portion 23. Thus, the branch flow F2 is prone to branch off from the vortex V4. In view of this, the labyrinth seal 30 includes the above [structure 9]. Thus, the vortex V4 flows into the small diameter portion annular groove 72. Since the flow rate of the branch flow F2 that branches off from the vortex V4 can be lowered, the fluid leakage in the gap 25 can be prevented more.

(Advantages of Tenth Aspect of Invention)

[Structure 10] The small diameter portion annular groove 72 is formed so as to extend from the position of the diameter-decreasing step portion 42 toward the low-pressure side X2.

With the above [structure 10], the small diameter portion annular groove 72 is formed so as to extend to the limit toward the high-pressure side X1. Thus, the capacity of the small diameter portion annular groove 72 can be increased and hence the vortex V4 can be made large. Since the fluid energy loss of the vortex V4 can be increased more, the fluid leakage in the gap 25 can be prevented more.

(Advantages of Eleventh Aspect of Invention)

Gb and Lb shown in FIG. 2 are defined as follows. Gb is the distance in the axial direction X between the diameter-decreasing step portion 42 and the distal end of the small diameter portion side fin (third fin 53). Lb is the distance in the axial direction X between the diameter-decreasing step portion 42 and the end located on the radially outer side Y1 and on the low-pressure side X2 in the small diameter portion annular groove 72.

[Structure 11] With the above definitions, the relationship "0.78<Gb/Lb<1.22" is satisfied.

With the above [structure 11], the gap δ3 (see FIG. 1) between the small diameter portion side fin (third fin 53) and the rotary body 20 can be made smaller than the case of Gb/Lb≤0.78. Thus, the fluid leakage through the gap δ3 can be prevented more and hence the fluid leakage in the gap 25 can be prevented more (see FIG. 5). Furthermore, the flow rate of the vortex V4 that flows into the small diameter portion annular groove 72 shown in FIG. 1 can be made higher than the case of 1.22≤Gb/Lb. Since the fluid energy loss of the vortex V4 can be increased more, hence the fluid leakage in the gap 25 can be prevented more (see FIG. 5).

(Advantages of Twelfth Aspect of Invention)

[Structure 12] The diameter-increasing step portion 41 is the step portion on the high-pressure side X1 (refer to the above [structure 1-1]). The diameter-decreasing step portion 42 is the step portion on the low-pressure side X2 (refer to the above [structure 1-1]).

With the above [structure 12], the same advantages as the above-mentioned "(advantages of the first aspect of the invention)" can be obtained.

Second Embodiment

With regard to a labyrinth seal 230 according to a second embodiment, the differences from the first embodiment are described with reference to FIG. 6. Descriptions of features that are also found in the first embodiment are omitted using the same symbols as in the first embodiment (descriptions of common features are omitted also in the description of the other embodiments) in the labyrinth seal 230 according to the second embodiment. The difference is that the fins 50 are inclined with respect to the radial direction Y.

The distal end of the second fin 52 is located close to the high-pressure side X1 compared to the proximal end (the end on the radially outer side Y1) of the second fin 52. In a cross section taken perpendicularly to the circumferential direction, the second fin 52, its high-pressure-side surface 52a, and its low-pressure-side surface 52b are straight. In a cross section taken perpendicularly to the circumferential direction, the high-pressure-side surface 52a is inclined with respect to the radial direction Y by an angle α2. In a cross section taken perpendicularly to the circumferential direction, the second fin 52 may be either curved or bent into an L shape or the like (this also applies to the first fin 51 and the third fin 53).

The first fin 51 and the third fin 53 are formed in the same manner as the second fin 52. In a cross section taken perpendicularly to the circumferential direction, the side surface on the high-pressure side X1 in the first fin 51 is inclined with respect to the radial direction Y by an angle α1. In a cross section taken perpendicularly to the circumferential direction, the high-pressure-side surface 53a of the third fin 53 is inclined with respect to the radial direction Y by an angle α3. The angles α1, α2, and α3 may be such that all of them are identical, only a part of them are identical, or all of them are different from each other. One of the angles α1, α2, and α3 may be equal to 0°.

(Advantages of Second Aspect of the Invention)

Figure 6:
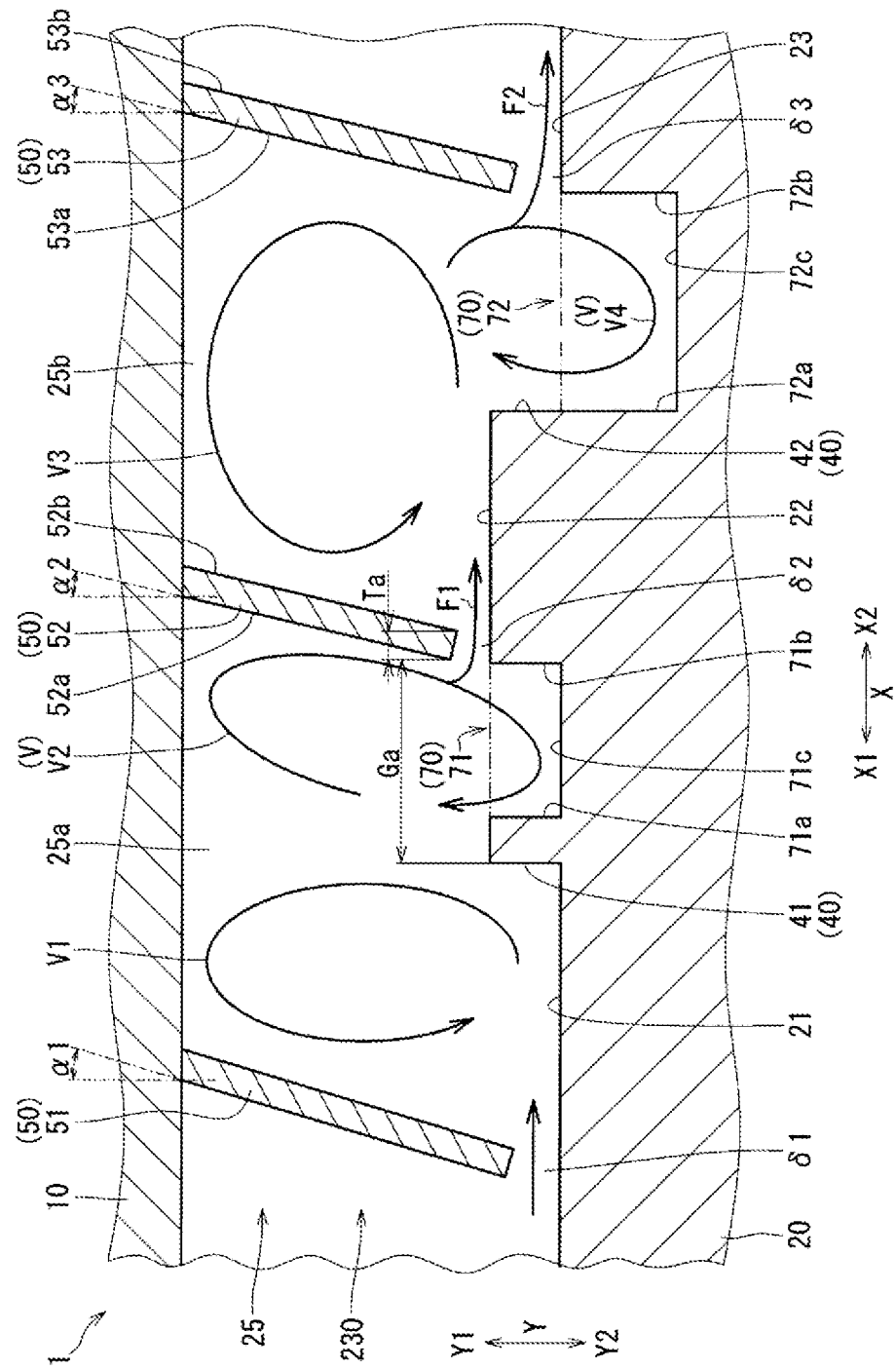
FIG. 6 shows a second embodiment and corresponds to FIG. 1.

Advantages of the labyrinth seal 230 shown in FIG. 6 are as follows. The labyrinth seal 230 includes at least one of the following [structure 2-1] and [structure 2-2].

[Structure 2-1] Of the fins 50 that are located close to the low-pressure side X2 compared to the large diameter portion annular groove 71, the one fin closest to the large diameter portion annular groove 71 is referred to as a fin on the low-pressure side X2 (in this embodiment, second fin 52). The distal end of the fin on the low-pressure side X2 (second fin 52) is located close to the high-pressure side X1 compared to the proximal end of the fin on the low-pressure side X2 (second fin 52).

[Structure 2-2] Of the fins 50 that are located close to the low-pressure side X2 compared to the small diameter portion annular groove 72, the one fin closest to the small diameter portion annular groove 72 is referred to as a fin on the low-pressure side X2 (in this embodiment, third fin 53). The distal end of the fin on the low-pressure side X2 (third fin 53) is located close to the high-pressure side X1 compared to the proximal end of the fin on the low-pressure side X2 (third fin 53).

The following advantages are obtained in the case where the labyrinth seal 30 includes the above [structure 2-1]. As the vortex V2 flows along the low-pressure side X2 (second fin 52), it is directed to the high-pressure side X1. Thus, the flow rate of the branch flow F1 flowing toward the low-pressure side X2 can be lowered and the flow rate of the vortex V2 that flows into the large diameter portion annular groove 71 can be made higher. As a result, the fluid leakage in the gap 25 can be prevented more.

The following advantages are obtained in the case where the labyrinth seal 30 includes the above [structure 2-2]. The fluid (V4, F2) that has been diverted radially inward (Y2) by the third fin 53 is directed to the high-pressure side X1 as it flows radially inward (Y2). Thus, the flow rate of the branch flow F2 flowing toward the low-pressure side X2 can be lowered and the flow rate of the vortex V4 that flows into the small diameter portion annular groove 72 can be made higher. Furthermore, when a fluid flowing toward the third fin 53, that is, toward the low-pressure side X2, hits the third fin 53, it is apt to be diverted radially outward (Y1) (to form the vortex V3) and is less prone to flow radially inward (Y2). Thus, the flow rate of the branch flow F2 can be lowered. As a result, the fluid leakage in the gap 25 can be prevented more.

Third Embodiment

Figure 7:
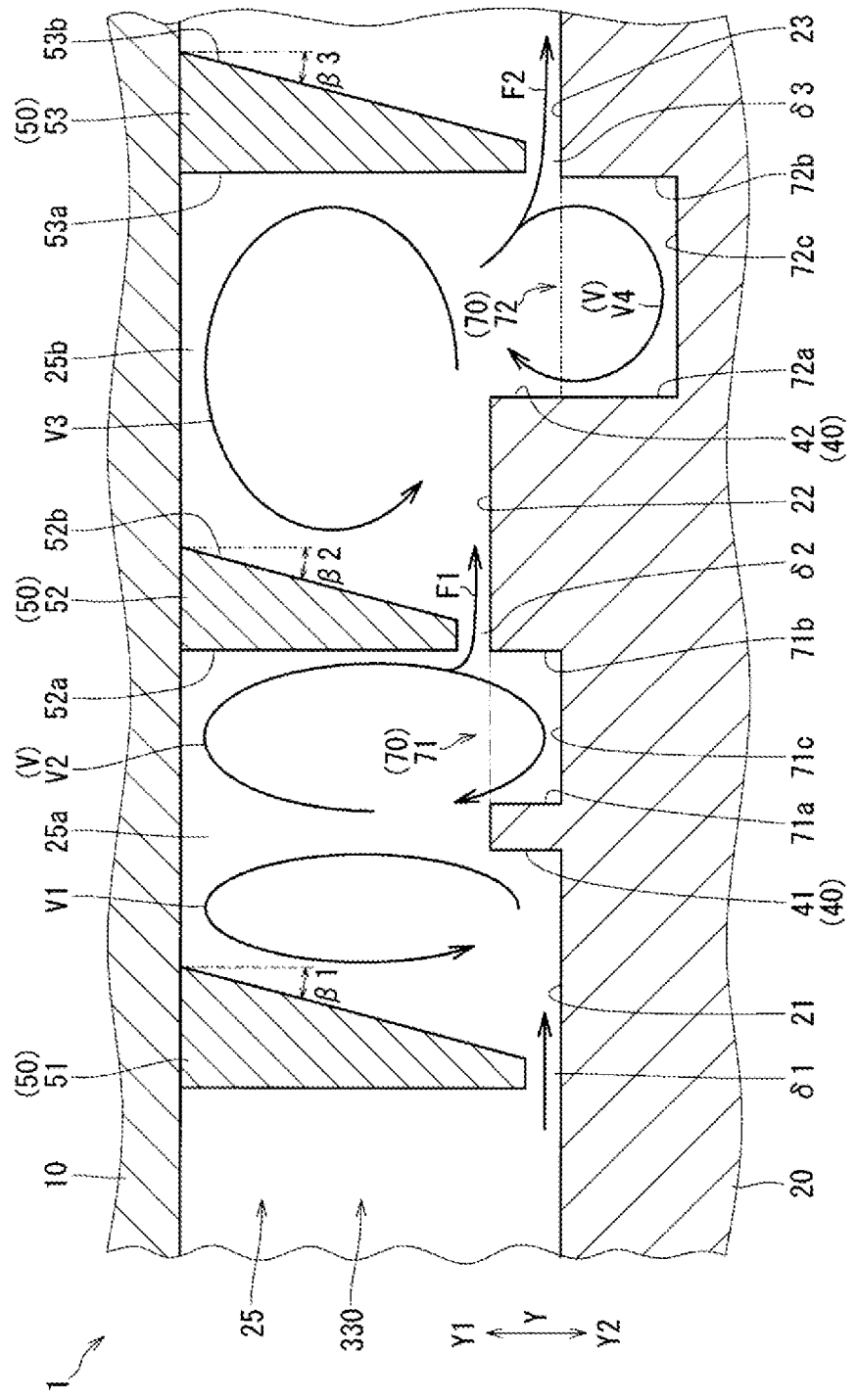
FIG. 7 shows a third embodiment and corresponds to FIG. 1.

With regard to a labyrinth seal 330 according to a third embodiment, the differences from the first embodiment are described with reference to FIG. 7. The low-pressure-side surface 52b of the second fin 52 is inclined with respect to the radial direction Y by an angle β2. The width of the second fin 52 in the axial direction X decreases as the position goes radially inward (Y2). The first fin 51 and the third fin 53 are formed in the same manner as the second fin 52. The surface of the first fin 51 on the low-pressure side X2 is inclined with respect to the radial direction Y by an angle β1. The low-pressure-side surface 53b of the second fin 53 is inclined with respect to the radial direction Y by an angle β3. The angles β1, β2, and β3 may be such that all of them are identical, only a part of them are identical, or all of them are different from each other.

Fourth Embodiment

With regard to a labyrinth seal 430 according to a fourth embodiment, the difference from the first embodiment are described with reference to FIG. 8. The differences are that the large diameter portion annular groove 71 has an arc-shaped portion 471d and the small diameter portion annular groove 72 has an arc-shaped portion 472d.

The arc-shaped portion 471d is formed at the bottom of the large diameter portion annular groove 71. In a cross section taken perpendicularly to the circumferential direction, the arc-shaped portion 471d has an arc shape that projects radially inward (Y2), the arc being an elliptical arc (i.e., a curve that is part of an ellipse), more specifically, a semi-ellipse. The above term "elliptical arc" includes an approximately elliptical arc (e.g., an arc that is approximately semi-cylindrical). The high-pressure-side surface 71a and the low-pressure-side surface 71b are formed so as to be continuous with the arc-shaped portion 471d. When the arc-shaped portion 471d is formed, the high-pressure-side surface 71a and the low-pressure-side surface 71b need not always be formed (the same thing also applies to the small diameter portion annular groove 72).

The arc-shaped portion 472d is formed at the bottom of the small diameter portion annular groove 72. In a cross section taken perpendicularly to the circumferential direction, the arc-shaped portion 472d has an arc shape that projects radially inward (Y2), the arc being a circular arc, more specifically, a semicircle (i.e., a circular arc whose central angle is 180°). The central angle of the circular arc may be smaller than 180°. The above term "circular arc" includes an approximately circular arc (e.g., an arc that is approximately semicircular). Only one of the arc-shaped portion 471d and the arc-shaped portion 472d may be provided. In a cross section taken perpendicularly to the circumferential direction, the arc-shaped portion 471d may have a circular arc shape and the arc-shaped portion 472d may have an elliptical arc shape.

(Advantages of Third Aspect of Invention)

Figure 8:
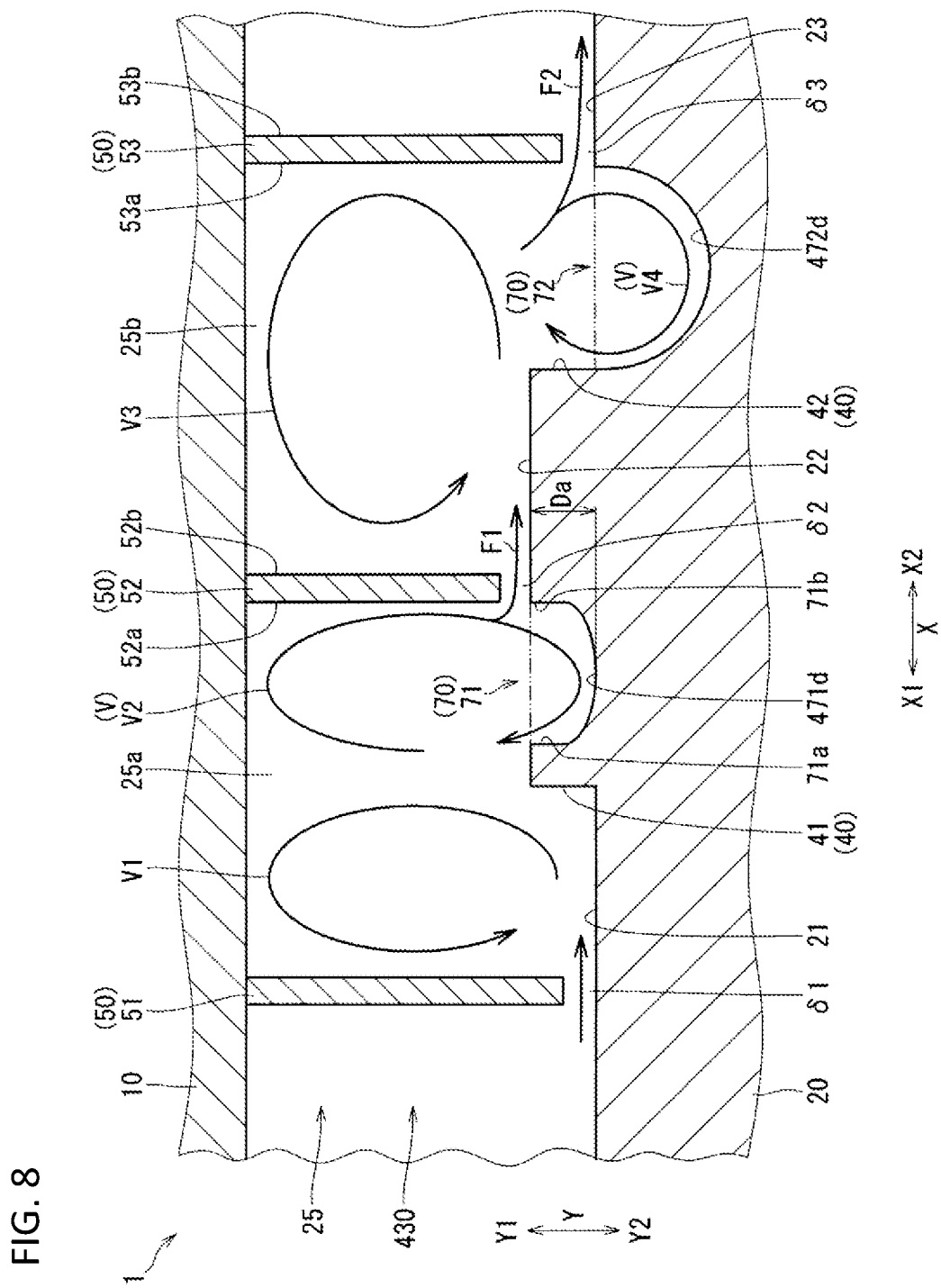
FIG. 8 shows a fourth embodiment and corresponds to FIG. 1.

Advantages of the labyrinth seal 430 shown in FIG. 8 are as follows. The labyrinth seal 430 includes at least one of the following [structure 3-1] and [structure 3-2].

[Structure 3-1] In a cross section taken perpendicularly to the circumferential direction, the bottom portion (arc-shaped portion 471d) of the large diameter portion annular groove 71 has an arc shape that projects radially inward (Y2).

[Structure 3-2] In a cross section taken perpendicularly to the circumferential direction, the bottom portion (arc-shaped portion 472d) of the small diameter portion annular groove 72 has an arc shape that projects radially inward (Y2).

When the labyrinth seal 430 includes the above [structure 3-1], in a cross section taken perpendicularly to the circumferential direction, the shape of the large diameter portion annular groove 71 is closer to a flow shape of the vortex V2 than in the case where the inside shape of the large diameter portion annular groove 71 is rectangular (see FIG. 1). Thus, the vortex V2 flows along the bottom portion of the large diameter portion annular groove 71 and hence reduction of the flow speed of the vortex V2 in the large diameter portion annular groove 71 can be prevented. Since the energy loss of the vortex V2 can be increased, the fluid leakage in the gap 25 can be prevented more. Likewise, when labyrinth seal 430 includes the above [structure 3-2], the vortex V4 flows along the bottom portion of the small diameter portion annular groove 72. Since the energy loss of the vortex V4 can be increased, the fluid leakage in the gap 25 can be prevented more.

Fifth Embodiment

With regard to a labyrinth seal 530 according to a fifth embodiment, the differences from the first embodiment are described with reference to FIG. 9. The differences are in the shape of the large diameter portion annular groove 71, the shape of the small diameter portion annular groove 72, and the shape of a diameter-decreasing step portion 542. The large diameter portion annular groove 71 has a high-pressure-side slant portion 571e (slant portion) and a low-pressure-side slant portion 571f (slant portion). The small diameter portion annular groove 72 has a high-pressure-side slant portion 572e (slant portion) and a low-pressure-side slant portion 572f (slant portion).

The high-pressure-side slant portion 571e is formed in the portion on the high-pressure side X1 in the large diameter portion annular groove 71. The end of the high-pressure-side slant portion 571e on the radially inner side Y2 is located close to the low-pressure side X2 compared to the end of the high-pressure-side slant portion 571e on the radially outer side Y1 (i.e., located on the axially center side of the large diameter portion annular groove 71). In a cross section taken perpendicularly to the circumferential direction, the high-pressure-side slant portion 571e is straight and is inclined with respect to the radial direction Y by an angle θa.

The low-pressure-side slant portion 571f is formed in the portion on the low-pressure side X2 in the large diameter portion annular groove 71. The end of the low-pressure-side slant portion 571f on the radially inner side Y2 is located close to the high-pressure side X1 compared to the end of the low-pressure-side slant portion 571f on the radially outer side Y1 (i.e., located on the axially center side of the annular groove 70). In a cross section taken perpendicularly to the circumferential direction, the low-pressure-side slant portion 571f is straight and is inclined with respect to the radial direction Y by an angle ϕa.

The high-pressure-side slant portion 572e is formed in the same manner as the high-pressure-side slant portion 571e of the large diameter portion annular groove 71. In a cross section taken perpendicularly to the circumferential direction, the high-pressure-side slant portion 572e is inclined with respect to the radial direction Y by an angle θb. In a cross section taken perpendicularly to the circumferential direction, the diameter-decreasing step portion 542 is inclined with respect to the radial direction Y by the same angle θb as the high-pressure-side slant portion 572e is. In a cross section taken perpendicularly to the circumferential direction, the high-pressure-side slant portion 572e and the diameter-decreasing step portion 542 form a straight line.

The low-pressure-side slant portion 572f is formed in the same manner as the low-pressure-side slant portion 571f of the large diameter portion annular groove 71. In a cross section taken perpendicularly to the circumferential direction, the low-pressure-side slant portion 572f is inclined with respect to the radial direction Y by an angle ϕb. Either all or a part of the high-pressure-side slant portion 571e, the low-pressure-side slant portion 571f, the high-pressure-side slant portion 572e, and the low-pressure-side slant portion 572f may be formed. The diameter-decreasing step portion 542 need not always be inclined with respect to the radial direction Y.

(Advantages of the Fourth Aspect of Invention)

Figure 9:
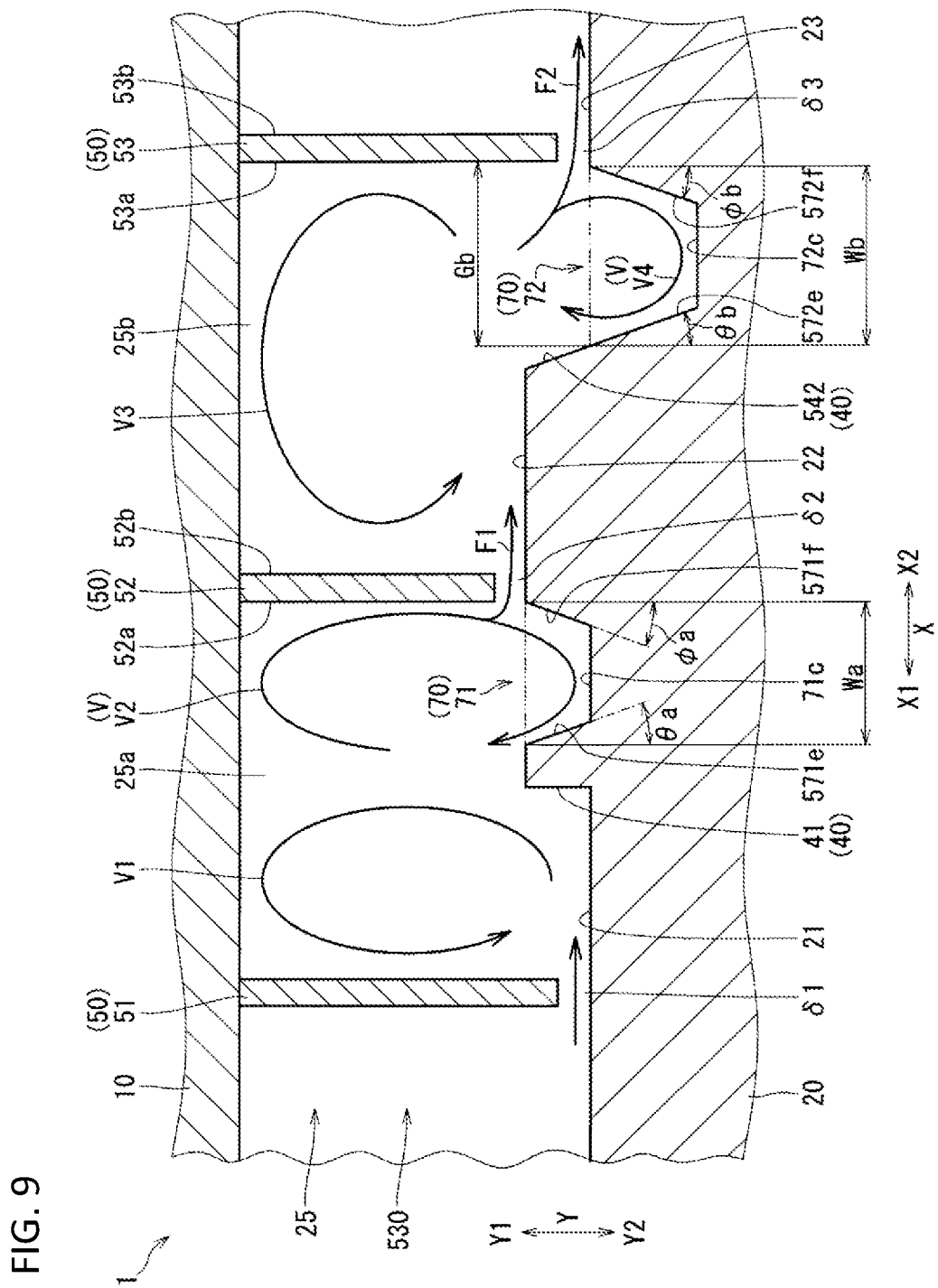
FIG. 9 shows a fifth embodiment and corresponds to FIG. 1.

Advantages of the labyrinth seal 530 shown in FIG. 9 are as follows. The large diameter portion annular groove 71 has the slant portion(s) (at least one of the high-pressure-side slant portion 571e and the low-pressure-side slant portion 571f) at least one of its portion on the high-pressure side X1 and its portion on the low-pressure side X2. The labyrinth seal 530 includes at least one of the following [structure 4-1] and [structure 4-2].

[Structure 4-1] The end of the high-pressure-side slant portion 571e on the radially inner side Y2 is located close to the axially center side of the large diameter portion annular groove 71 compared to the end of the high-pressure-side slant portion 571e on the radially outer side Y1 (i.e., located on the low-pressure side X2 of the latter end).

[Structure 4-2] The end of the low-pressure-side slant portion 571f on the radially inner side Y2 is located close to the axially center side of the large diameter portion annular groove 71 compared to the end of the low-pressure-side slant portion 571f on the radially outer side Y1 (i.e., located on the high-pressure side X1 of the latter end).

When the labyrinth seal 530 includes the above [structure 4-1], in a cross section perpendicularly to the circumferential direction, the shape of the large diameter portion annular groove 71 is closer to a flow shape of the vortex V2 than the case where the inside shape of the large diameter portion annular groove 71 is rectangular (see FIG. 1). Thus, the vortex V2 flows along the high-pressure-side slant portion 571e and hence reduction of the flow speed of the vortex V2 in the large diameter portion annular groove 71 can be prevented. Since the energy loss of the vortex V2 can be increased, the fluid leakage in the gap 25 can be prevented more. Likewise, when labyrinth seal 530 includes the above [structure 4-2], the vortex V2 flows along the low-pressure-side slant portion 571f. Since the energy loss of the vortex V2 can be increased, the fluid leakage in the gap 25 can be prevented more. Likewise, when the small diameter portion annular groove 72 has at least one of the high-pressure-side slant portion 572e and the low-pressure-side slant portion 572f, the following advantage is obtained. The vortex V4 flows along the high-pressure-side slant portion 572e or the low-pressure-side slant portion 572f. Since the energy loss of the vortex V4 can be increased, the fluid leakage in the gap 25 can be prevented more.

Sixth Embodiment

Figure 10:
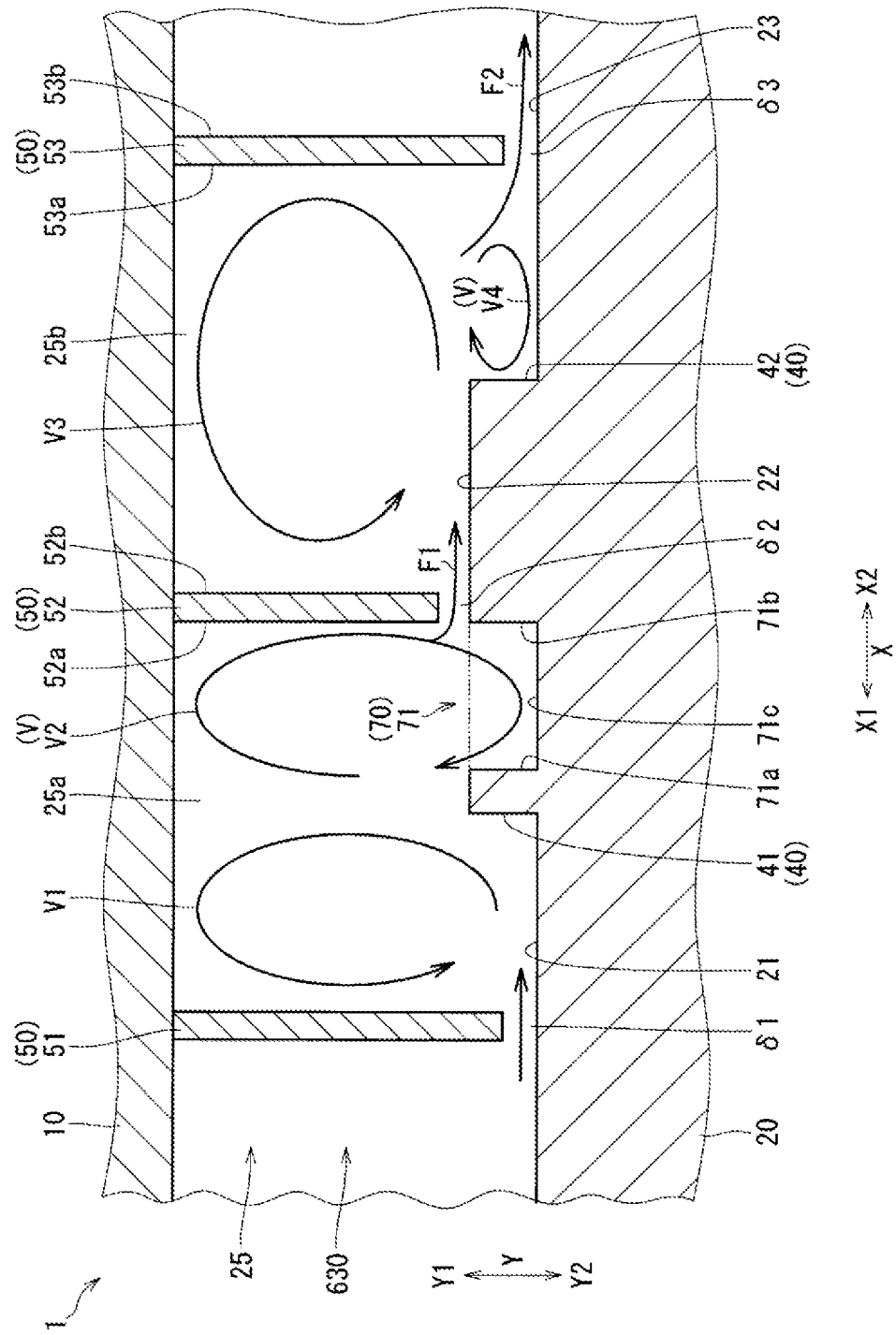
FIG. 10 shows a sixth embodiment and corresponds to FIG. 1.

With regard to a labyrinth seal 630 according to a sixth embodiment, the differences from the first embodiment are described with reference to FIG. 10. Whereas the labyrinth seal 630 includes the large diameter portion annular groove 71, it is not provided with the small diameter portion annular groove 72 (see FIG. 1). Thus, the vortex V4 becomes smaller than the first embodiment. In the labyrinth seal 630, the fluid leakage in the gap 25 can be made smaller than in the labyrinth seal that includes neither the large diameter portion annular groove 71 nor the small diameter portion annular groove 72 (the same is true of a seventh embodiment).

Seventh Embodiment

With regard to a labyrinth seal 730 according to the seventh embodiment, the difference from the first embodiment is described with reference to FIG. 11. Whereas the labyrinth seal 730 includes the small diameter portion annular groove 72, it is not provided with the large diameter portion annular groove 71 (see FIG. 1). Thus, the vortex V2 becomes smaller than the first embodiment.

Eighth Embodiment

With regard to a labyrinth seal 830 according to an eighth embodiment, the differences from the first embodiment are described with reference to FIG. 12.

As shown in FIG. 1, in the labyrinth seal 30 according to the first embodiment, the diameter-decrease-side structure 30b is provided close to the low-pressure side X2 compared to the diameter-increase-side structure 30a. On the other hand, in the labyrinth seal 830 according to the eighth embodiment, the diameter-decrease-side structure 30b is provided close to the high-pressure side X1 compared to the diameter-increase-side structure 30a. The manners of fluid flows in the diameter-increase-side structure 30a in the eighth embodiment are the same as those in the diameter-increase-side structure 30a in the first embodiment (the same is true of the manners of fluid flows in the diameter-decrease-side structure 30b).

Figure 12:
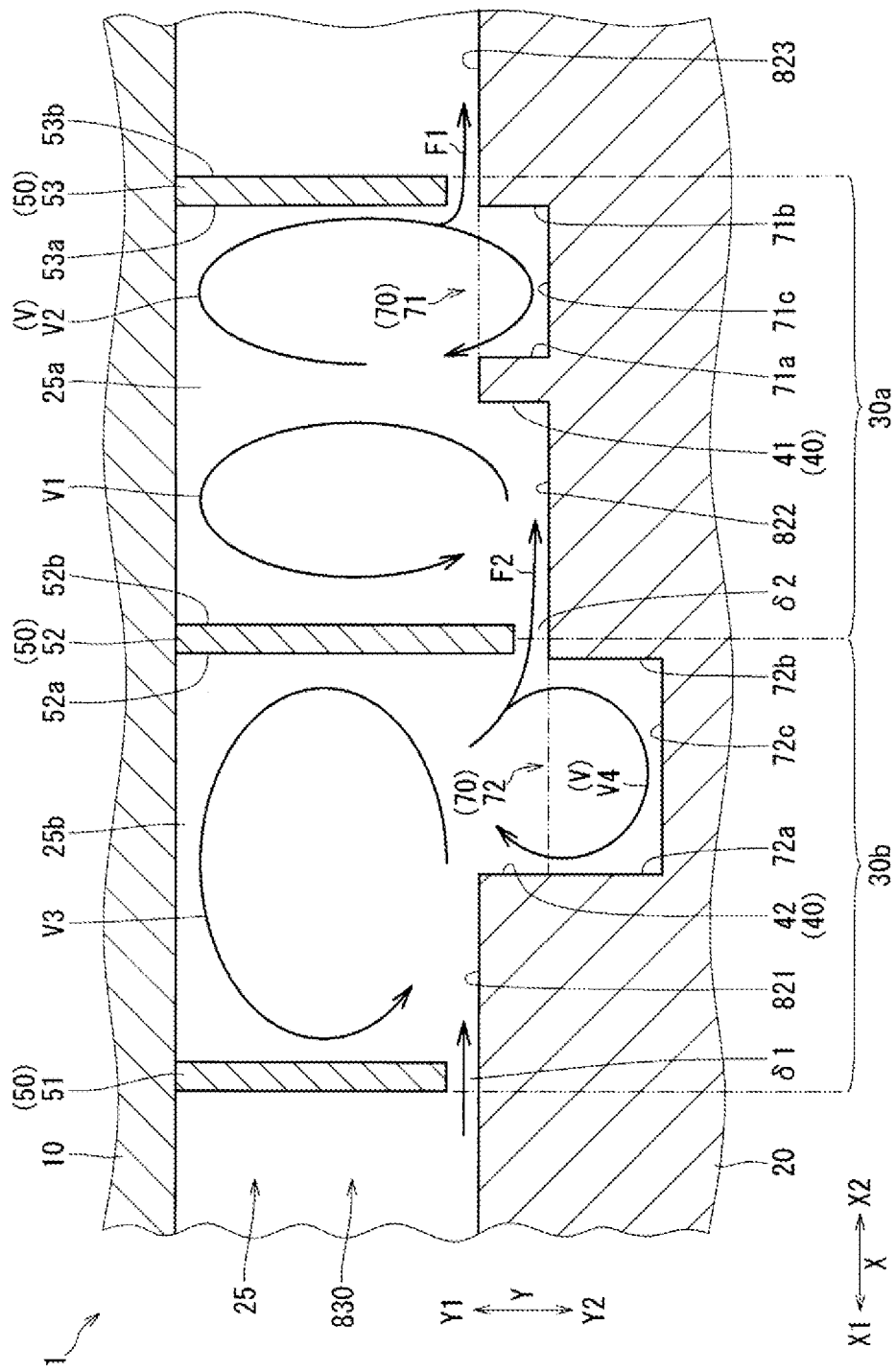
FIG. 12 shows an eighth embodiment and corresponds to FIG. 1.

The following descriptions are made by referring to FIG. 1 for the constituent elements of the first embodiment and referring to FIG. 12 for the constituent elements of the eighth embodiment. Whereas in the first embodiment the above-mentioned "step portion on the high-pressure side X1" is the diameter-increasing step portion 41, in the eighth embodiment it is the diameter-decreasing step portion 42. Whereas in the first embodiment the above-mentioned "step portion on the low-pressure side X2" is the diameter-decreasing step portion 42, in the eighth embodiment it is the diameter-increasing step portion 41. Whereas in the first embodiment the above-mentioned "large diameter portion side fin" is the second fin 52, in the eighth embodiment it is the third fin 53. Whereas in the first embodiment the above-mentioned "small diameter portion side fin" is the third fin 53, in the eighth embodiment it is the second fin 52.

In the first embodiment, the rotary body 20 includes the high-pressure-side small diameter portion 21, the large diameter portion 22, and the low-pressure-side small diameter portion 23. On the other hand, in the eighth embodiment, the rotary body 20 includes a high-pressure-side large diameter portion 821, a small diameter portion 822, and the low-pressure-side large diameter portion 823 which are arranged in this order from the high-pressure side X1 to the low-pressure side X2. The small diameter portion 822 is smaller in diameter than the high-pressure-side large diameter portion 821. The low-pressure-side large diameter portion 823 is larger in diameter than the small diameter portion 822. The low-pressure-side large diameter portion 823 is, for example, the same in diameter as the high-pressure-side large diameter portion 821, and may be either smaller or larger in diameter than the high-pressure-side large diameter portion 821.

(Advantages of the 13th Aspect of Invention)

Advantages of the labyrinth seal 830 shown in FIG. 12 are as follows.

[Structure 13] The diameter-decreasing step portion 42 is the step portion on the high-pressure side X1. The diameter-increasing step portion 41 is the step portion on the low-pressure side X2.

The same advantages as the above-mentioned "(advantages of first aspect of invention)" can be obtained by the above [structure 13].

Ninth Embodiment

With regard to a labyrinth seal 930 according to a ninth embodiment, the differences from the first embodiment are described with reference to FIG. 13. The labyrinth seal 930 includes plural diameter-increase-side structures 30a and plural diameter-decrease-side structures 30b. For example, the number of diameter-increase-side structures 30a is equal to 3 and the number of diameter-decrease-side structures 30b is equal to 3. These numbers may be changed. The number of diameter-increase-side structures 30a and the number of diameter-decrease-side structures 30b may be either identical (3) or different from each other. The diameter-increase-side structures 30a and the diameter-decrease-side structures 30b are arranged in line alternately adjacent to each other in the axial direction X.

The labyrinth seal 930 may be modified in the same manners as in the second to seventh embodiments. Although the example of FIG. 13 is such that, of the diameter-increase-side structures 30a and the diameter-decrease-side structures 30b, the one located close to the high-pressure side X1 compared to the others is the diameter-increase-side structures 30a, it may be the diameter-decrease-side structures 30b (as in the eighth embodiment).

(Advantages of 14th Aspect of the Invention)

Figure 13:
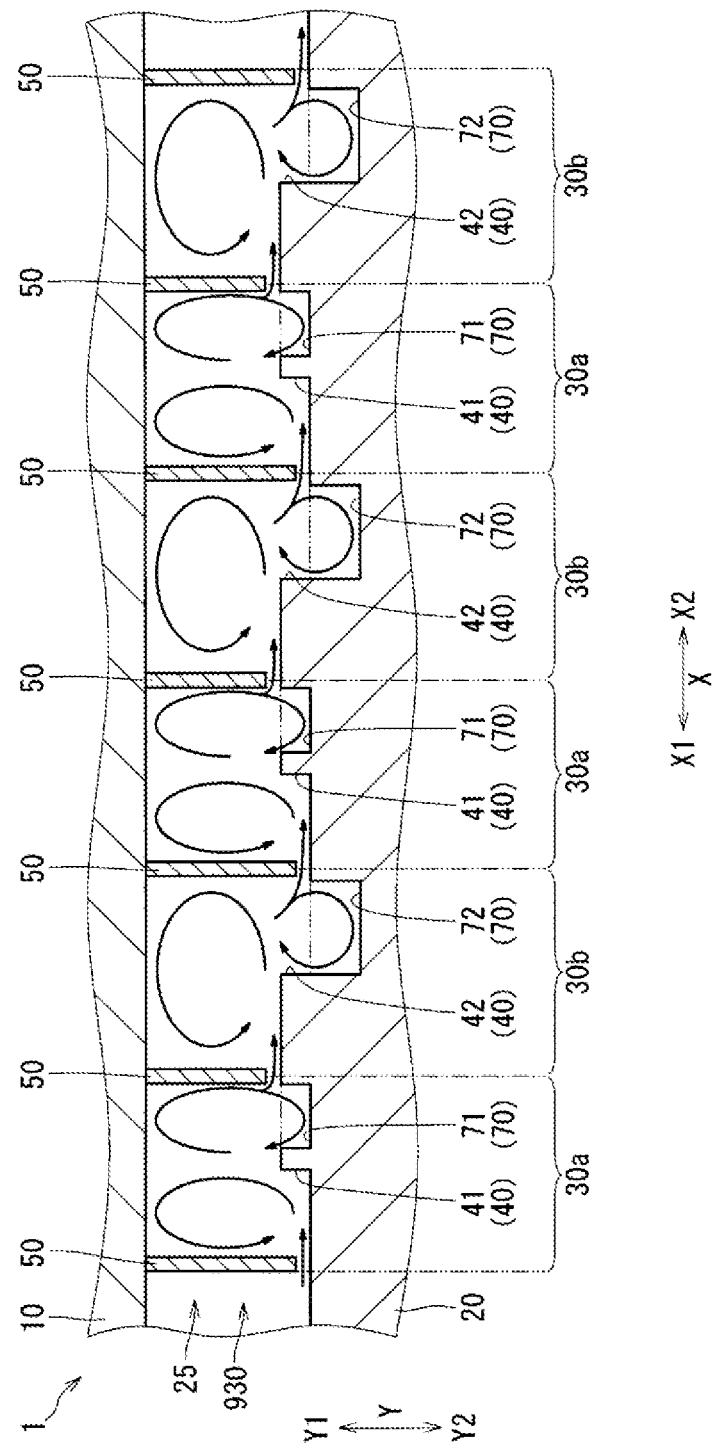
FIG. 13 shows a ninth embodiment and corresponds to FIG. 1.

Advantages of the labyrinth seal 930 shown in FIG. 13 are as follows.

[Structure 14] Plural structures each having the diameter-increasing step portion 41, the diameter-decreasing step portion 42, the fins 50, and the annular grooves 70 (i.e., diameter-increase-side structure 30a and diameter-decrease-side structure 30b) are arranged in line in the axial direction X.

With the above [structure 14], the fluid leakage in the gap 25 can be made smaller than the case where only one diameter-increase-side structure 30a and only one diameter-decrease-side structure 30b are included.

Tenth Embodiment

Figure 14:
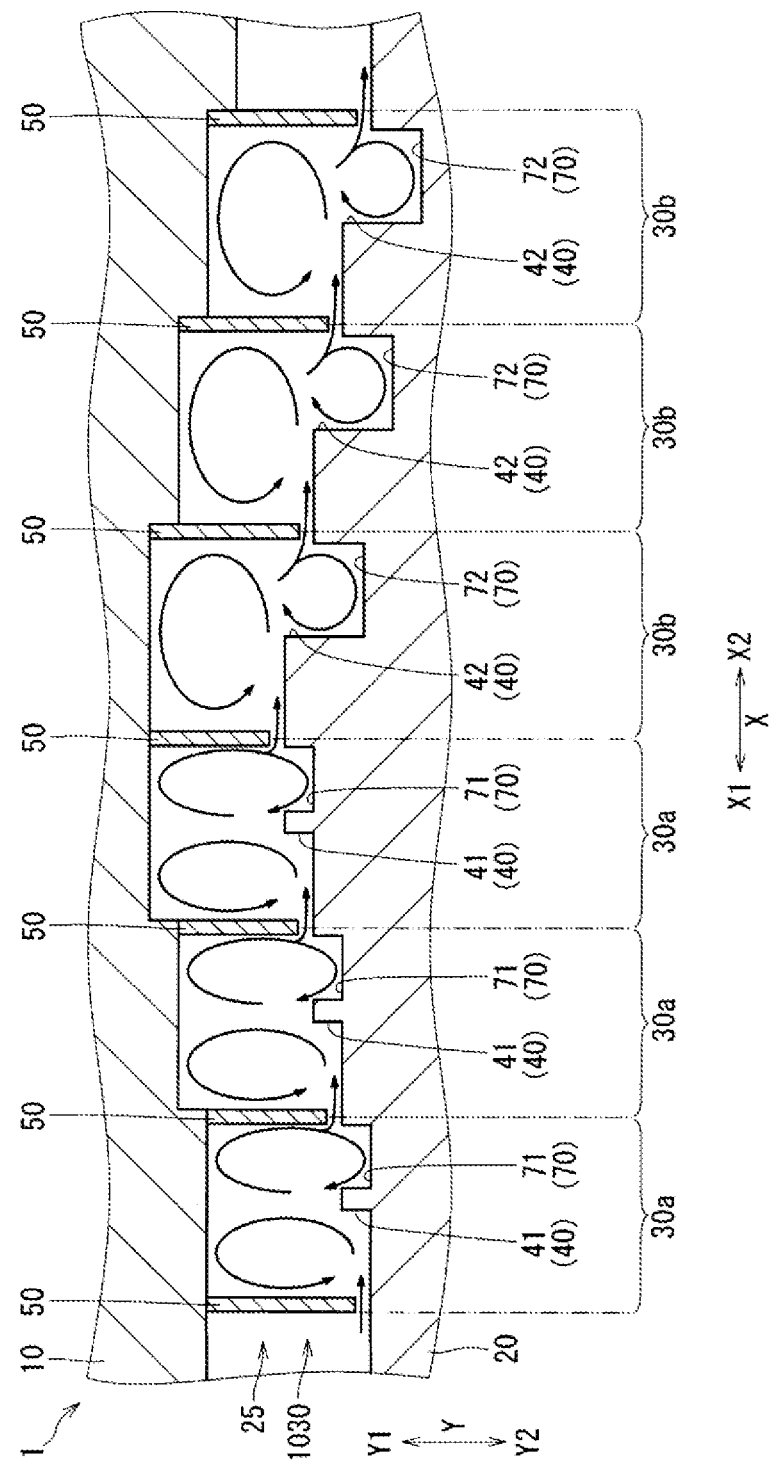
FIG. 14 shows a tenth embodiment and corresponds to FIG. 1.

With regard to a labyrinth seal 1030 according to a tenth embodiment, the differences from the ninth embodiment are described with reference to FIG. 14. In the ninth embodiment, the diameter-increase-side structures 30a and the diameter-decrease-side structures 30b are arranged alternately in the axial direction X. On the other hand, in the tenth embodiment, plural (in FIG. 14, three) diameter-increase-side structures 30a are arranged adjacent to each other in the radial direction X. In addition, plural (in FIG. 14, three) diameter-decrease-side structures 30b are arranged adjacent to each other in the radial direction X. The one provided close to the low-pressure side X2 compared to the other diameter-increase-side structures 30a is located adjacent to the one provided close to the high-pressure side X1 compared to the other diameter-decrease-side structures 30b. Alternatively, the diameter-increase-side structures 30a and the diameter-decrease-side structures 30b may be arranged in line in the axial direction X in irregular order.
(Analysis of Leakage Rate)

Leakage rates of the following first configuration, second configuration, third configuration, and comparative example configuration were calculated by a CFD (computational fluid dynamics) analysis and compared with each other. The first configuration is a configuration that includes a labyrinth seal 1130 shown in FIG. 15 and is configured in the following manner. As in the ninth embodiment (see FIG. 13), three diameter-increase-side structures 30a and three diameter-decrease-side structures 30b are arranged alternately in the axial direction X. The shapes of fins 50 are the same as in the third embodiment (see FIG. 7). The shapes of annular grooves 70 are the same as in the first embodiment (see FIG. 1). A groove 1172 that is similar to the small diameter portion annular groove 72 and a step 1142 that is similar to the diameter-decreasing step portion 42 are formed close to the high-pressure side X1 compared to the diameter-increase-side structure 30a that is located close to the high-pressure side X1 compared to the other ones.

The distance Ca, the distance Cb, and the thickness Tb shown in FIG. 2 are defined as follows. The distance Ca is the distance (clearance) in the radial direction Y between the distal end of the second fin 52 and the rotary body 20 (large diameter portion 22). The distance Cb is the distance in the radial direction Y between the distal end of the third fin 53 and the rotary body 20 (low-pressure-side small diameter portion 23). In the model used for the leakage rate analysis, the distance Cb is equal to the distance Ca (the distance Cb is represented by C). The thickness Tb is the width of the distal end of the third fin 53 in the radial direction X.

Figure 15:
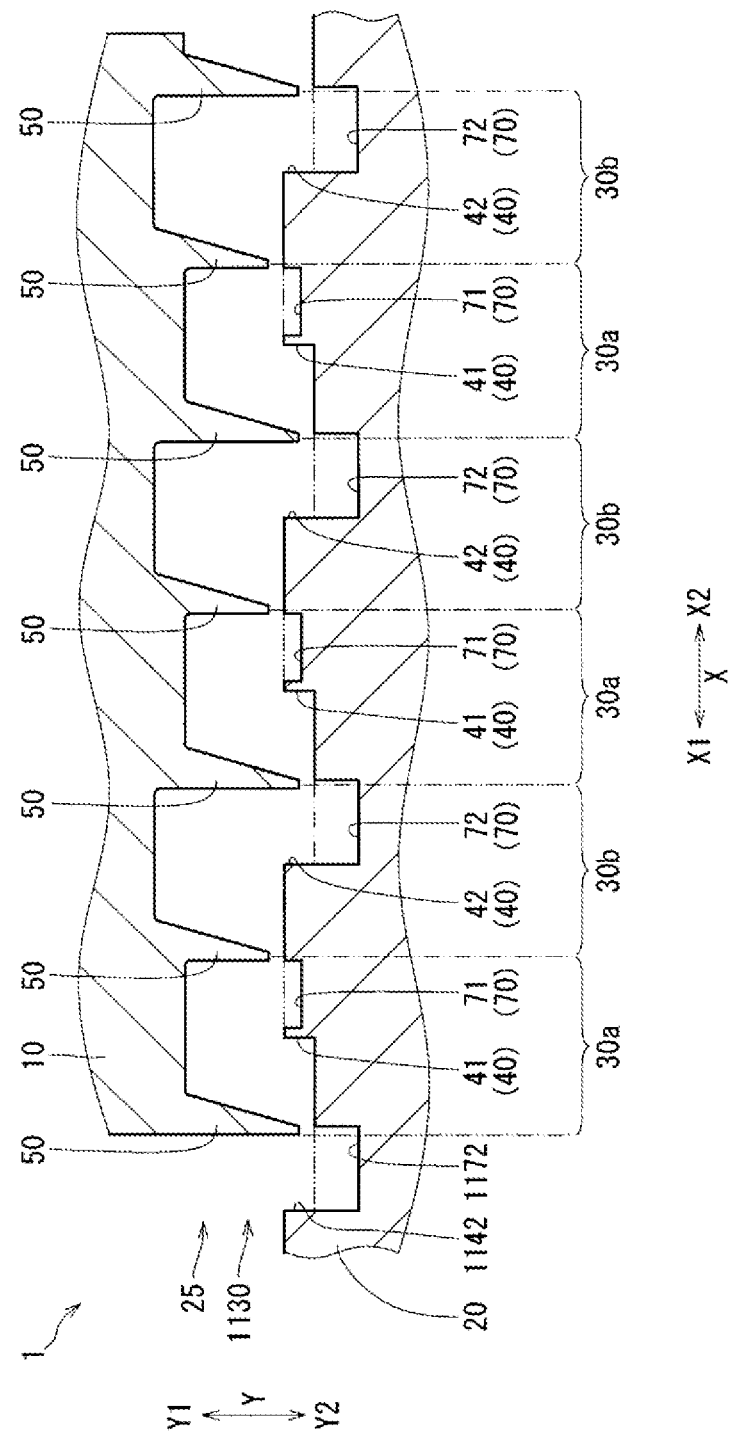
FIG. 15 is a sectional view of a rotary machine whose leakage rate was analyzed.

Dimensionless sizes shown in FIG. 2 that are expressed in terms of the distance C shown in FIG. 2 relating to the labyrinth seal 1130 shown in FIG. 15 are as follows (refer to FIG. 2 for the meanings of the respective sizes):

$Ga=9C$ $Wa=9C$ $Ha=2C$ $Ta=C$ $La=10C$ $Gb=5C$ $Wb=5.5C$ $Tb=0.5C.$

Figure 11:
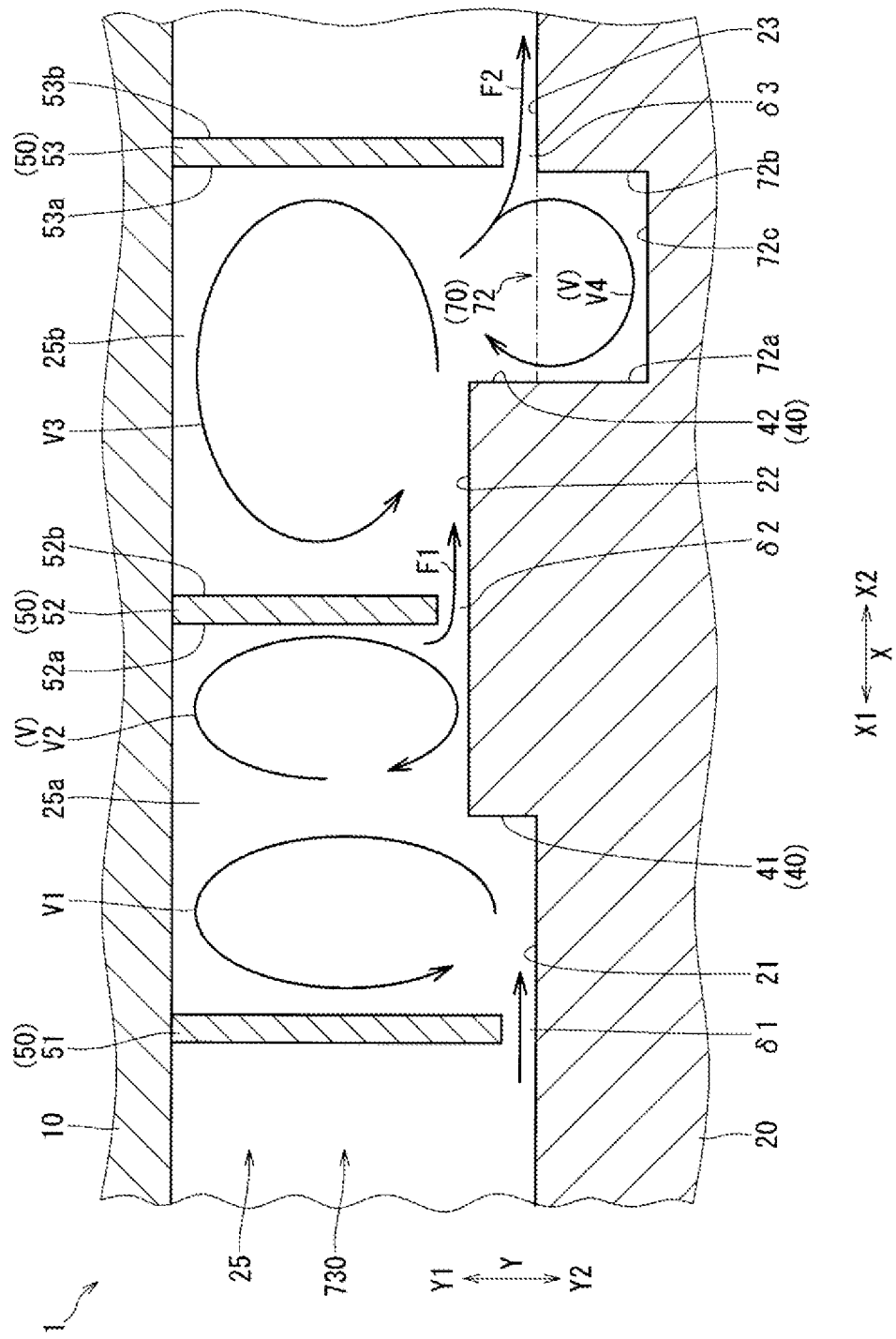
FIG. 11 shows a seventh embodiment and corresponds to FIG. 1.

The second configuration is a configuration that is different from the labyrinth seal 1130 shown in FIG. 15 in that all the large diameter portion annular grooves 71 are omitted (in the same manner as in the seventh embodiment shown in FIG. 11). The third configuration is a configuration that is different from the labyrinth seal 1130 in that all the small diameter portion annular grooves 72 and the groove 1172 are omitted (refer to the sixth embodiment shown in FIG. 10). The comparative example configuration is a configuration that is different from the labyrinth seal 1130 in that all the large diameter portion annular grooves 71, all the small diameter portion annular grooves 72, and the groove 1172 are omitted.

Figure 16:
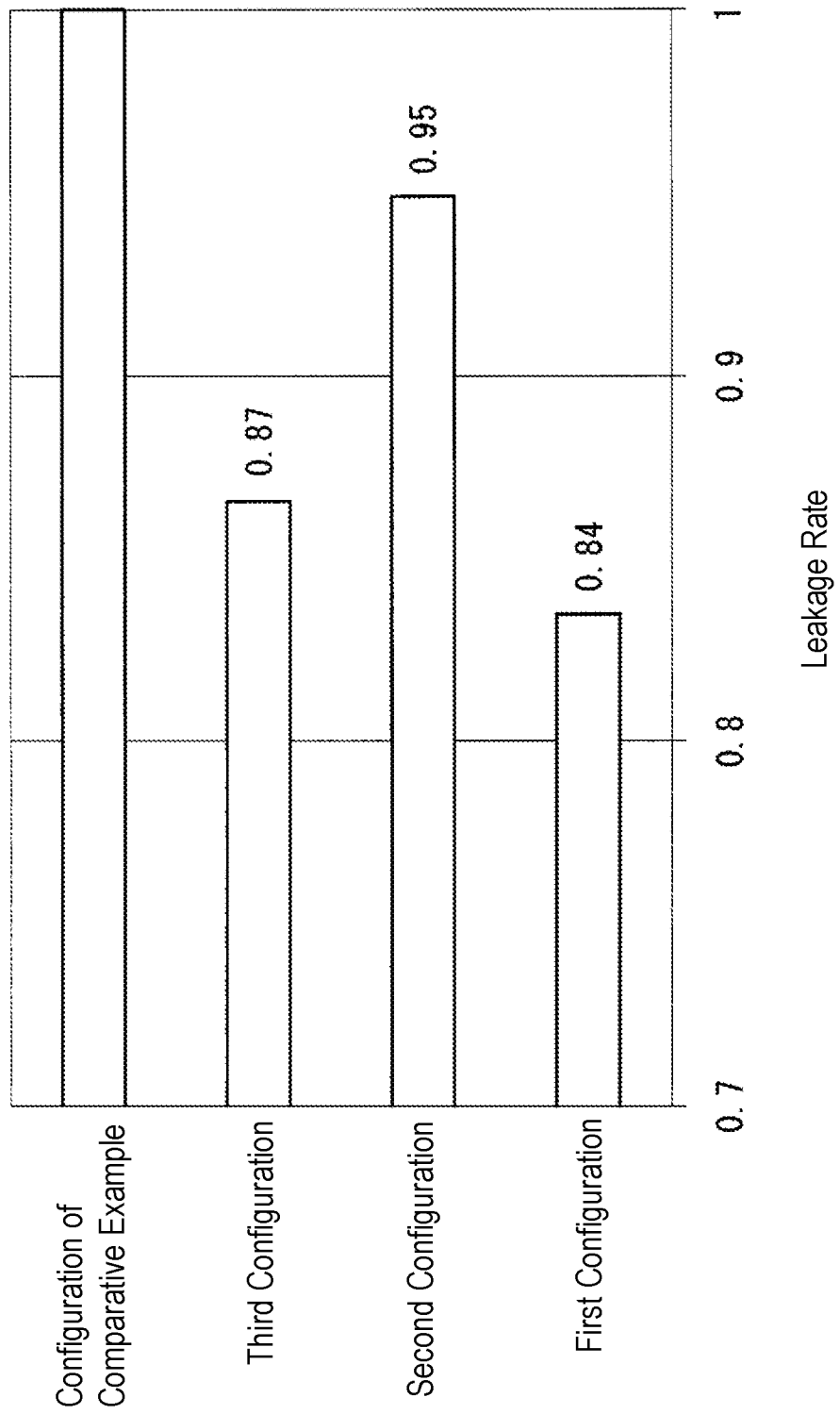
FIG. 16 is a graph showing leakage rates of four respective configurations.

FIG. 16 shows a comparison results of leakage rates. In the first configuration, the second configuration, and the third configuration, the leakage rate was made lower successfully than in the comparative example configuration. In the first configuration, the leakage rate was decreased by more than 15% from the comparative example configuration.
(Modifications)

Each of the above embodiments may be modified in various manners. A part of the constituent elements of each of the above embodiments may be omitted. The number of same constituent elements of each of the above embodiments may be changed. Sets of constituent elements of different embodiments may be combined together. For example, different shapes than the shapes of the large diameter portion annular groove 71 and the small diameter portion annular groove 72 shown in FIG. 1 etc. may be employed. For example, the structure that the inside shape of the large diameter portion annular groove 71 is rectangular in a cross section taken perpendicularly to the circumferential direction (see FIG. 1) and the structure that the small diameter portion annular groove 72 has the arc-shaped portion 472d (see FIG. 8) may be combined together. For another example, at least one of the high-pressure-side slant portion 572e and the low-pressure-side slant portion 572f shown in FIG. 9 may be added to the small diameter portion annular groove 72 having the arc-shaped portion 472d.

This application is based on Japanese Patent Application No. 2016-109199 filed on May 31, 2016, the contents of which are incorporated herein by reference.

DESCRIPTION OF REFERENCE NUMERALS AND SIGNS

1: Rotary machine
10: Stationary body
20: Rotary body
25: Gap
30, 230, 330, 430, 530, 630, 730, 830, 930, 1030, 1130: Labyrinth seal
40: Step portion
41: Diameter-increasing step portion (high-pressure-side step portion, low-pressure-side step portion)

42, 542: Diameter-decreasing step portion (high-pressure-side step portion, low-pressure-side step portion)
50: Fin
51: First fin
52: Second fin (low-pressure-side fin, large diameter portion side fin, small diameter portion side fin)
53: Third fin (low-pressure-side fin, large diameter portion side fin, small diameter portion side fin)
70: Annular groove
71: Large diameter portion annular groove
72: Small diameter portion annular groove
471d, 472d: Arc-shaped portion
571e, 572e: High-pressure-side slant portion (slant portion)
571f, 572f: Low-pressure-side slant portion (slant portion)
X: Axial direction
X1: High-pressure side
X2: Low-pressure side
Y: Radial direction
Y1: Radially outer side
Y2: Radially inner side

The invention claimed is:
1. A labyrinth seal to be included in a rotary machine, the labyrinth seal comprising:
a plurality of step portions formed on an outer circumferential portion of a rotary body of the rotary machine;
a plurality of fins extending radially inward from an inner circumferential portion of a stationary body of the rotary machine; and
at least one annular groove formed in the outer circumferential portion of the rotary body,
wherein when the seal is included in the rotary machine, a gap is formed between the inner circumferential portion of the stationary body and the outer circumferential portion of the rotary body so that a fluid flows in an axial direction from a high-pressure side to a low-pressure side;
wherein the plurality of step portions comprise:
a diameter-increasing step portion constituted so that a diameter thereof on the low-pressure side is larger than a diameter thereof on the high-pressure side; and
a diameter-decreasing step portion constituted so that a diameter thereof on the low-pressure side is smaller than a diameter thereof on the high-pressure side;
wherein a step portion located on the high-pressure side, between the diameter-increasing step portion and the diameter-decreasing step portion, is referred to as a high-pressure-side step portion and another step portion located on the low-pressure side is referred to as a low-pressure-side step portion,
wherein the plurality of fins comprises:
a first fin disposed close to the high-pressure side compared to the high-pressure-side step portion;
a second fin disposed close to the low-pressure side compared to the high-pressure-side step portion and close to the high-pressure side compared to the low-pressure-side step portion; and
a third fin disposed close to the low-pressure side compared to the low-pressure-side step portion, and
wherein the at least one annular groove is disposed in at least a part of a region that is located close to the low-pressure side compared to the high-pressure-side step portion and close to the high-pressure side compared to the third fin;
wherein the fin disposed closest to the diameter-increasing step portion, among the fins disposed close to the low-pressure side compared to the diameter-increasing step portion, is referred to as a large diameter portion side fin;
wherein the at least one annular groove includes a large diameter portion annular groove that is disposed in at least a part of a region that is located close to the low-pressure side compared to the diameter-increasing step portion and close to the high-pressure side compared to the large diameter portion side fin;
wherein the first fin and the second fin are immediately adjacent to each other without any other fin between them; and
wherein the following relationship is satisfied:

$0.6 < Da/Ha,$ wherein Ha is a width of the diameter-increasing step portion in the radial direction, and Da is a width of the large diameter portion annular groove in the radial direction.

2. The labyrinth seal according to claim 1, wherein when the fin disposed closest to the at least one annular groove, among the fins disposed close to the low-pressure side compared to the annular groove, is referred to as a low-pressure-side fin, a distal end of the low-pressure side fin is located close to the high-pressure side compared to a proximal end of the low-pressure-side fin.

3. The labyrinth seal according to claim 1, wherein a bottom portion of the at least one annular groove has an arc shape that projects radially inward, in a cross section taken perpendicular to a circumferential direction of the rotary body.

4. The labyrinth seal according to claim 1, wherein:
the at least one annular groove has a slant portion formed in at least one of a high-pressure-side portion and a low-pressure-side portion in the annular groove; and
a radially inner end of the slant portion is located close to an axially center side of the at least one annular groove compared to a radially outer end of the slant portion.

5. The labyrinth seal according to claim 1, wherein the fin disposed closest to the diameter-increasing step portion, among the fins disposed close to the low-pressure side compared to the diameter-increasing step portion, is referred to as a large diameter portion side fin;
wherein the following relationship is satisfied:

$0 < La/Ga < 1.1 + Ta/Ga,$ wherein La is a distance in the radial direction between the diameter-increasing step portion and a radially outer end on the low-pressure side in the large diameter portion annular groove, Ga is a distance in the radial direction between the diameter-increasing step portion and a distal end on the high-pressure side in the large diameter portion side fin, and Ta is a width of a distal end of the large diameter portion side fin in the radial direction.

6. The labyrinth seal according to claim 5, wherein the following relationship is satisfied:

$0.6 < La/Ga < 1.1 + Ta/Ga.$

7. The labyrinth seal according to claim 1, wherein when the fin disposed closest to the diameter-decreasing step portion, among the fins disposed close to the low-pressure side compared to the diameter-decreasing step portion, is referred to as a small diameter portion side fin, the at least one annular groove has a small diameter portion annular groove that is disposed in at least a part of a region that is located close to the low-pressure side compared to the diameter-decreasing step portion and close to the high-pressure side compared to the small diameter portion side fin.

8. The labyrinth seal according to claim 7, wherein the small diameter portion annular groove is formed so as to extend from the position of the diameter-decreasing step portion toward the low-pressure side.

9. The labyrinth seal according to claim 7, wherein the following relationship is satisfied:

$0.78 < Gb/Lb < 1.22$, wherein Gb is a distance in the radial direction between the diameter-decreasing step portion and a distal end of the small diameter portion side fin, and Lb is a distance in the radial direction between the diameter-decreasing step portion and a radially outer end on the low-pressure side in the small diameter portion annular groove.

10. The labyrinth seal according to claim 1, wherein the diameter-increasing step portion is the high-pressure-side step portion and the diameter-decreasing step portion is the low-pressure-side step portion.

11. The labyrinth seal according to claim 1, wherein the diameter-decreasing step portion is the high-pressure-side step portion and the diameter-increasing step portion is the low-pressure-side step portion.

12. The labyrinth seal according to claim 1, further comprising an additional diameter-increasing step portion, an additional diameter-decreasing step portion, an additional fin, and an additional annular groove arranged in line in the radial direction.

13. The labyrinth seal according to claim 1, wherein when the fin closest to the diameter-decreasing step portion, among the fins disposed close to the low-pressure side compared to the diameter-decreasing step portion, is referred to as a small diameter portion side fin, the at least one annular groove includes a small diameter portion annular groove that is disposed in at least a part of a region that is located close to the low-pressure side compared to the diameter-decreasing step portion and close to the high-pressure side compared to the small diameter portion side fin.

* * * * *